US011996051B2

(12) United States Patent
Ka et al.

(10) Patent No.: US 11,996,051 B2
(45) **Date of Patent: *May 28, 2024**

(54) DISPLAY PANEL OF AN ORGANIC LIGHT EMITTING DIODE DISPLAY DEVICE, AND ORGANIC LIGHT EMITTING DIODE DISPLAY DEVICE INCLUDING PIXELS THAT DIFFER IN TERMS OF SIZES OF AT LEAST ONE TRANSISTOR AND/OR CAPACITOR

(71) Applicant: Samsung Display Co., Ltd., Yongin-Si (KR)

(72) Inventors: Ji-Hyun Ka, Seongnam-si (KR); Nackhyeon Keum, Hwaseong-si (KR); Kimyeong Eom, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,431

(22) Filed: Feb. 6, 2023

(65) Prior Publication Data

US 2023/0186856 A1 Jun. 15, 2023

Related U.S. Application Data

(63) Continuation of application No. 17/199,851, filed on Mar. 12, 2021, now Pat. No. 11,574,594.

(30) Foreign Application Priority Data

Aug. 5, 2020 (KR) ........................ 10-2020-0097951

(51) Int. Cl.
*G09G 3/3258* (2016.01)
*G09G 3/3266* (2016.01)
*G09G 3/3291* (2016.01)

(52) U.S. Cl.
CPC ......... *G09G 3/3258* (2013.01); *G09G 3/3291* (2013.01); *G09G 3/3266* (2013.01); *G09G 2300/0876* (2013.01)

(58) Field of Classification Search
None
See application file for complete search history.

(56) References Cited

U.S. PATENT DOCUMENTS

| | | | | |
|---|---|---|---|---|
| 8,063,853 B2 * | 11/2011 | Jung | G09G 3/3233 | 345/76 |
| 10,181,289 B1 * | 1/2019 | Chen | G09G 3/3233 | |
| 2003/0197665 A1 * | 10/2003 | Sung | G09G 3/3233 | 345/82 |
| 2007/0040770 A1 * | 2/2007 | Kim | G09G 3/3291 | 345/76 |

(Continued)

*Primary Examiner* — Kirk W Hermann
(74) *Attorney, Agent, or Firm* — Innovation Counsel LLP

(57) ABSTRACT

A display panel of an OLED display device includes a first pixel configured to emit first color light, a second pixel configured to emit second color light, and a third pixel configured to emit third color light. Each of the first, second and third pixels includes at least two transistors, at least one capacitor and an organic light emitting diode. At least one of at least two transistors or at least one capacitor included in the third pixel has a size different from a size of a corresponding one at least two transistors or at least one capacitor included in the first pixel or the second pixel.

18 Claims, 19 Drawing Sheets

(56) References Cited

U.S. PATENT DOCUMENTS

| | | | |
|---|---|---|---|
| 2007/0075955 | A1 | 4/2007 | Jung et al. |
| 2013/0063330 | A1 | 3/2013 | Eom |
| 2016/0056225 | A1 | 2/2016 | Lee et al. |
| 2016/0225318 | A1* | 8/2016 | Choi .................... G09G 3/3258 |
| 2016/0291368 | A1* | 10/2016 | Kim ...................... H01L 27/124 |
| 2017/0345367 | A1* | 11/2017 | Ka ..................... H10K 59/1213 |
| 2018/0158410 | A1 | 6/2018 | Jeon |
| 2018/0350286 | A1 | 12/2018 | Lee et al. |
| 2021/0174743 | A1* | 6/2021 | Chang .................. G09G 3/3258 |
| 2021/0193049 | A1 | 6/2021 | Lin et al. |
| 2021/0202612 | A1* | 7/2021 | Jung .................. H10K 59/1213 |
| 2021/0202642 | A1 | 7/2021 | Kwon et al. |

* cited by examiner

DISPLAY PANEL OF AN ORGANIC LIGHT EMITTING DIODE DISPLAY DEVICE, AND ORGANIC LIGHT EMITTING DIODE DISPLAY DEVICE INCLUDING PIXELS THAT DIFFER IN TERMS OF SIZES OF AT LEAST ONE TRANSISTOR AND/OR CAPACITOR

CROSS-REFERENCE TO RELATED APPLICATION(S)

This application is a continuation application of U.S. patent application Ser. No. 17/199,851 filed on Mar. 12, 2021, which claims priority under 35 USC § 119 to Korean Patent Application No. 10-2020-0097951, filed on Aug. 5, 2020, in the Korean Intellectual Property Office (KIPO), the disclosures of which are incorporated herein in their entirety by reference.

BACKGROUND

1. Field

Embodiments of the present inventive concept relate to a display device, and more particularly to a display panel of an organic light emitting diode (OLED) display device, and the OLED display device.

2. Description of the Related Art

Reduction of power consumption may be desirable in an organic light emitting diode (OLED) display device employed in a portable device such as a smartphone and a tablet computer. Recently, in order to reduce the power consumption of the OLED display device, a low frequency driving technique which decreases a driving frequency when displaying a still image has been developed. For example, when performing low frequency driving, the OLED display device may not drive a display panel at least one frame, and the display panel may display an image based on stored data voltages, thereby reducing power consumption of the OLED display device.

However, while the display panel displays an image based on the stored data voltages, the stored data voltages may be distorted by leakage currents in pixels of the display panel, and thus an image quality of the OLED display device may be degraded. Further, when a driving frequency for the display panel is changed from a previous driving frequency to a current driving frequency, luminance of the display panel driven at the current driving frequency may be different from luminance of the display panel driven at the previous driving frequency, and this luminance difference may be perceived by a user as a defect.

SUMMARY

Some embodiments provide a display panel of an organic light emitting diode (OLED) display device capable of reducing luminance difference when a driving frequency is changed.

Some embodiments provide an OLED display device capable of reducing luminance difference when a driving frequency is changed.

According to embodiments, there is provided a display panel of an OLED display device including a first pixel configured to emit first color light, a second pixel configured to emit second color light, and a third pixel configured to emit third color light. Each of the first, second and third pixels includes at least two transistors, at least one capacitor and an organic light emitting diode. At least two transistors or at least one capacitor included in the third pixel has a size different from a size of a corresponding one of at least two transistors and at least one capacitor included in the first pixel or the second pixel.

In embodiments, the size of the at least one of the at least two transistors and the at least one capacitor included in the third pixel may be determined such that a data voltage range for the third pixel is adjusted close to a data voltage range for the first pixel or the second pixel.

In embodiments, the at least one of the at least two transistors may be implemented with a p-type metal-oxide-semiconductor (PMOS) transistor, and another one of the at least two transistors may be implemented with an n-type metal-oxide-semiconductor (NMOS) transistor.

In embodiments, the first pixel may be a red pixel that emits red light, the second pixel may be a green pixel that emits green light, and the third pixel may be a blue pixel that emits blue light.

In embodiments, each of the red, green and blue pixels may include a storage capacitor including a first electrode coupled to a first power supply voltage line and a second electrode coupled to a gate node, a boost capacitor including a first electrode coupled to the gate node, and a second electrode coupled to a gate writing signal line, a first transistor including a gate electrode coupled to the gate node, a second transistor configured to transfer a data voltage to a source of the first transistor in response to a gate writing signal of the gate writing signal line, a third transistor configured to diode-connect the first transistor in response to a gate compensation signal of a gate compensation signal line, a fourth transistor configured to apply an initialization voltage to the gate node in response to a gate initialization signal, a fifth transistor configured to couple the first power supply voltage line and the source of the first transistor in response to an emission signal, a sixth transistor configured to couple a drain of the first transistor and an anode of the organic light emitting diode in response to the emission signal, and a seventh transistor configured to apply an anode initialization voltage to the anode of the organic light emitting diode in response to the gate compensation signal. The organic light emitting diode may include the anode and a cathode coupled to a second power supply voltage line.

In embodiments, the boost capacitor included in the blue pixel may have a capacitance lower than a capacitance of the boost capacitor included in the red pixel or the green pixel.

In embodiments, each of the red, green and blue pixels may further include a parasitic capacitor, and the parasitic capacitor included in the blue pixel may have a size different from a size of the parasitic capacitor included in the red pixel or the green pixel.

In embodiments, each of the red, green and blue pixels may further include a negative parasitic boost capacitor between the gate compensation signal line and the gate electrode of the first transistor, and the negative parasitic boost capacitor included in the blue pixel may have a capacitance higher than a capacitance of the negative parasitic boost capacitor included in the red pixel or the green pixel.

In embodiments, a width of the gate compensation signal line in the blue pixel may be greater than a width of the gate compensation signal line in the red pixel or the green pixel.

In embodiments, an area of the gate electrode of the first transistor in the blue pixel may be greater than an area of the gate electrode of the first transistor in the red pixel or the green pixel.

In embodiments, a ratio of a channel width to a channel length of the first transistor in the blue pixel may be greater than a ratio of a channel width to a channel length of the first transistor in the red pixel or the green pixel.

In embodiments, the channel width of the first transistor in the blue pixel may be greater than the channel width of the first transistor in the red pixel or the green pixel.

In embodiments, the channel length of the first transistor in the blue pixel may be less than the channel length of the first transistor in the red pixel or the green pixel.

In embodiments, the storage capacitor included in the blue pixel may have a capacitance higher than a capacitance of the storage capacitor included in the red pixel or the green pixel.

In embodiments, the first, second, fifth and sixth transistors may be implemented with PMOS transistors, and the third and fourth transistors may be implemented with NMOS transistors.

In embodiments, the seventh transistor may be implemented with a PMOS transistor.

In embodiments, the seventh transistor may be implemented with an NMOS transistor.

In embodiments, each of the red, green and blue pixels may include a storage capacitor including a first electrode coupled to a first power supply voltage line and a second electrode coupled to a gate node, a first transistor including a gate electrode coupled to the gate node, a second transistor configured to transfer a data voltage to a source of the first transistor in response to a gate writing signal of a gate writing signal line, a third transistor configured to diode-connect the first transistor in response to a gate compensation signal of a gate compensation signal line, a fourth transistor configured to apply an initialization voltage to the gate node in response to a gate initialization signal, a fifth transistor configured to couple the first power supply voltage line and the source of the first transistor in response to an emission signal, a sixth transistor configured to couple a drain of the first transistor and an anode of the organic light emitting diode in response to the emission signal, and a seventh transistor configured to apply an anode initialization voltage to the anode of the organic light emitting diode in response to the gate compensation signal. The organic light emitting diode may include the anode and a cathode coupled to a second power supply voltage line.

In embodiments, each of the red, green and blue pixels may further include a parasitic boost capacitor between the gate writing signal line and the gate electrode of the first transistor, and a negative parasitic boost capacitor between the gate compensation signal line and the gate electrode of the first transistor. At least one of the parasitic boost capacitor, the negative parasitic boost capacitor, the first transistor and the storage capacitor included in the blue pixel may have a size different from a size of a corresponding one of the parasitic boost capacitor, the negative parasitic boost capacitor, the first transistor and the storage capacitor included in the red pixel or the green pixel.

In embodiments, each of the red, green and blue pixels may include a storage capacitor including a first electrode coupled to a first power supply voltage line, and a second electrode coupled to a gate node, a first transistor including a gate electrode coupled to the gate node, a second transistor configured to transfer a data voltage to a source of the first transistor in response to a gate writing signal of a gate writing signal line, a third transistor configured to diode-connect the first transistor in response to a gate compensation signal of a gate compensation signal line, a fourth transistor configured to apply an initialization voltage to the gate node in response to a gate initialization signal, a fifth transistor configured to couple the first power supply voltage line and the source of the first transistor in response to an emission signal having a low level, a sixth transistor configured to couple a drain of the first transistor and an anode of the organic light emitting diode in response to the emission signal having the low level, and a seventh transistor configured to apply an anode initialization voltage to the anode of the organic light emitting diode in response to the emission signal having a high level. The organic light emitting diode may include the anode and a cathode coupled to a second power supply voltage line.

In embodiments, each of the red, green and blue pixels may include a storage capacitor including a first electrode coupled to a first power supply voltage line, and a second electrode coupled to a gate node, a first transistor including a gate electrode coupled to the gate node, a second transistor configured to transfer a data voltage to a source of the first transistor in response to a gate writing signal of a gate writing signal line, a third transistor configured to diode-connect the first transistor in response to a gate compensation signal of a gate compensation signal line, a fourth transistor configured to apply an initialization voltage to the gate node in response to a gate initialization signal, a fifth transistor configured to couple the first power supply voltage line and the source of the first transistor in response to an emission signal, a sixth transistor configured to couple a drain of the first transistor and an anode of the organic light emitting diode in response to the emission signal, and a seventh transistor configured to apply an anode initialization voltage to the anode of the organic light emitting diode in response to the gate writing signal for a next pixel row. The organic light emitting diode may include the anode and a cathode coupled to a second power supply voltage line.

In embodiments, the first, second, fifth and sixth transistors may be implemented with PMOS transistors, and the third and fourth transistors may be implemented with NMOS transistors.

In embodiments, the seventh transistor may be implemented with a PMOS transistor.

In embodiments, the seventh transistor may be implemented with an NMOS transistor.

According to embodiments, there is provided an OLED display device including a display panel including a first pixel configured to emit first color light, a second pixel configured to emit second color light, and a third pixel configured to emit third color light, a data driver configured to provide data voltages to the first, second and third pixels, a scan driver configured to provide a gate writing signal, a gate compensation signal and a gate initialization signal to the first, second and third pixels, an emission driver configured to provide an emission signal to the first, second and third pixels, and a controller configured to control the data driver, the scan driver and the emission driver. Each of the first, second and third pixels includes at least two transistors, at least one capacitor and an organic light emitting diode. At least one of at least two transistors or at least one capacitor included in the third pixel has a size different from a size of a corresponding one of at least two transistors or the at least one capacitor included in the first pixel or the second pixel.

As described above, in a display panel of an OLED display device and the OLED display device according to embodiments, each of first, second and third pixels may include at least two transistors, at least one capacitor and an organic light emitting diode. At least one of at least two transistors and at least one capacitor included in the third pixel may have a size different from a size of a corresponding one of at least two transistors and at least one capacitor included in the first pixel or the second pixel. Accordingly, when a driving frequency for the display panel is changed, a difference between luminance of the display panel driven at a previous driving frequency and luminance of the display panel driven at a current driving frequency may be reduced, and the luminance difference may not be perceived by a user.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Hereinafter, embodiments of the present inventive concept will be explained in detail with reference to the accompanying drawings.

Figure 1:
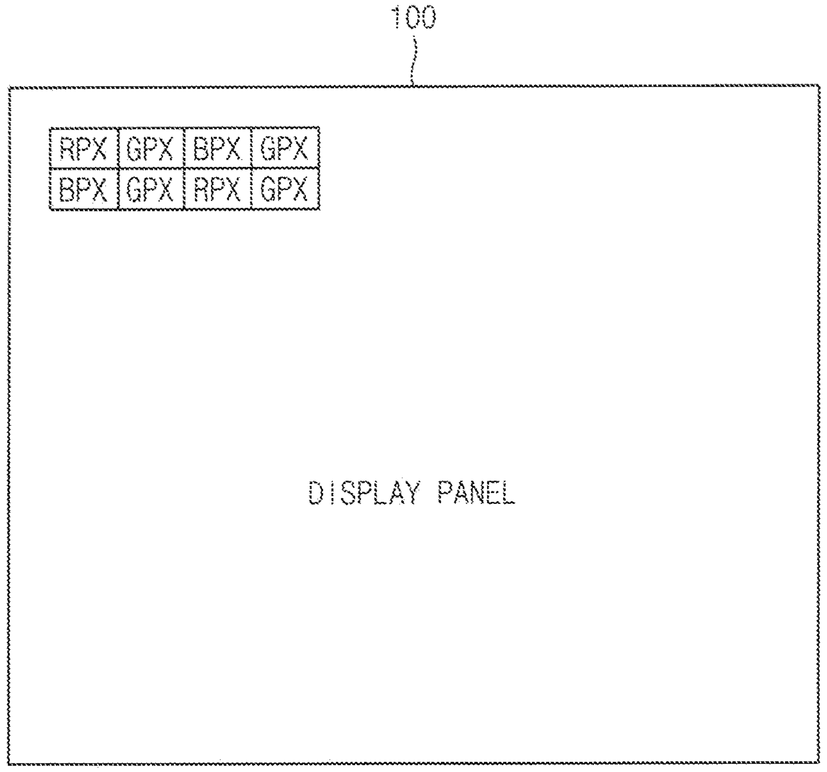
FIG. 1 is a block diagram illustrating a display panel of an organic light emitting diode (OLED) display device according to embodiments.
Figure 2:
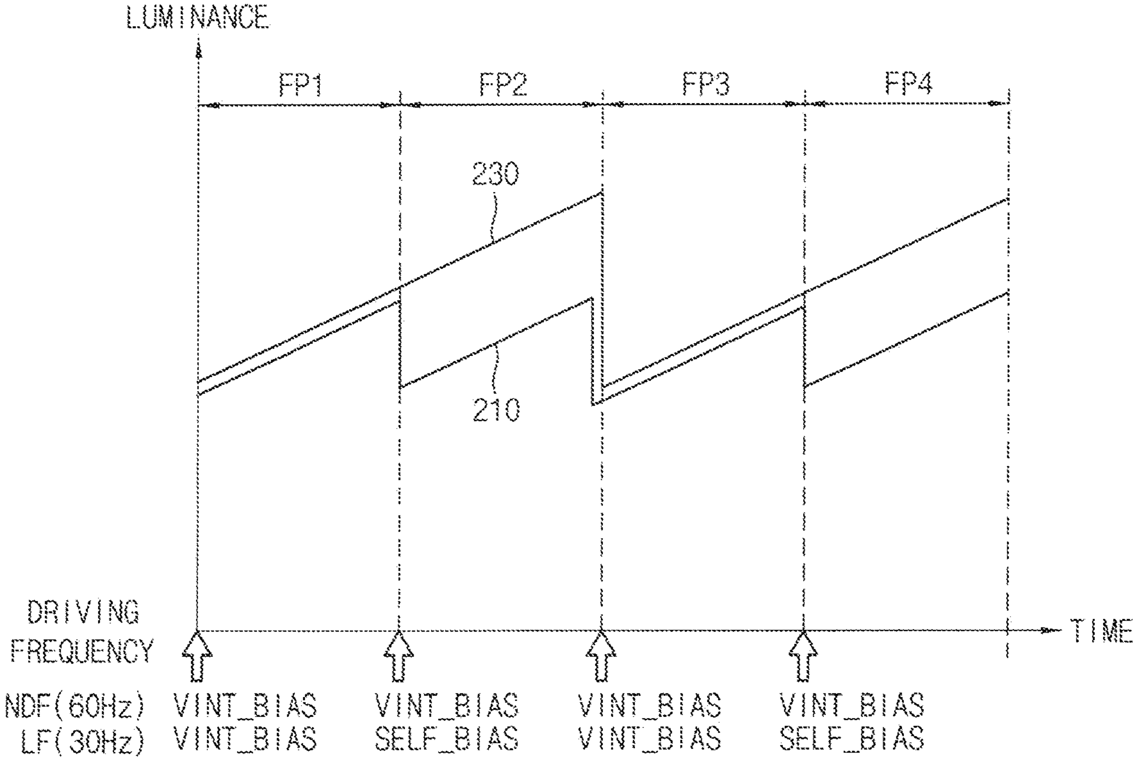
FIG. 2 is a diagram illustrating an example of luminance of a display panel driven at a normal driving frequency and luminance of a display panel driven at a low frequency lower than the normal driving frequency.
Figure 3:
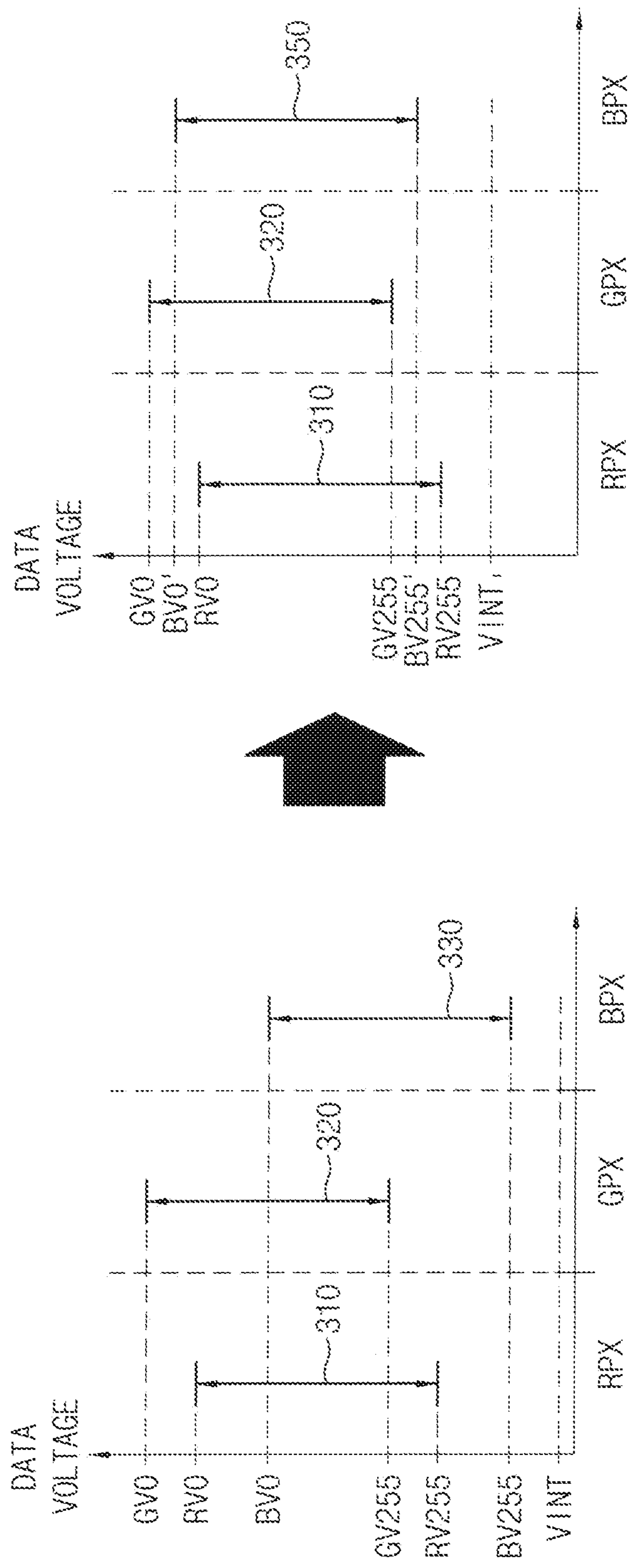
FIG. 3 is a diagram illustrating an example of data voltage ranges for red, green and blue pixels of a conventional display panel and data voltage ranges for red, green and blue pixels of a display panel according to embodiments.

FIG. 1 is a block diagram illustrating a display panel of an organic light emitting diode (OLED) display device according to embodiments, FIG. 2 is a diagram illustrating an example of luminance of a display panel driven at a normal driving frequency and luminance of a display panel driven at a low frequency lower than the normal driving frequency, and FIG. 3 is a diagram illustrating an example of data voltage ranges for red, green and blue pixels of a conventional display panel and data voltage ranges for red, green and blue pixels of a display panel according to embodiments.

Referring to FIG. 1, a display panel 100 of an OLED display device according to embodiments may include a first pixel RPX that emits first color light, a second pixel GPX that emits second color light, and a third pixel BPX that emits third color light. In some embodiments, the first pixel RPX may be, but not limited to, a red pixel RPX that emits red light, the second pixel GPX may be, but not limited to, a green pixel GPX that emits green light, and the third pixel BPX may be, but not limited to, a blue pixel BPX that emits blue light.

In some embodiments, as illustrated in FIG. 1, the display panel 100 may have, but not limited to, an RGBG pentile structure where red, green, blue and green pixels RPX, GPX, BPX and GPX are repeatedly arranged (i.e., in an RGBG arrangement) in each odd-numbered pixel row, and blue, green, red and green pixels BPX, GPX, RPX and GPX are repeatedly arranged (i.e., in a BGRG arrangement) in each even-numbered pixel row. For example, in the RGBG pentile structure, four organic light emitting diodes of red, green, blue and green pixels RPX, GPX, BPX and GPX that are disposed adjacent to each other may be disposed in, but not limited to, a diamond shape. In other embodiments, the display panel 100 may have, but not limited to, a RGB stripe structure where red, green and blue pixels RPX, GPX and BPX are repeatedly arranged in each pixel row. However, a pixel arrangement structure of the display panel 100 is not limited to the RGBG pentile structure and the RGB stripe structure, and the red, green and blue pixels RPX, GPX and BPX may be arranged in any form in the display panel 100 according to embodiments.

Figure 4:
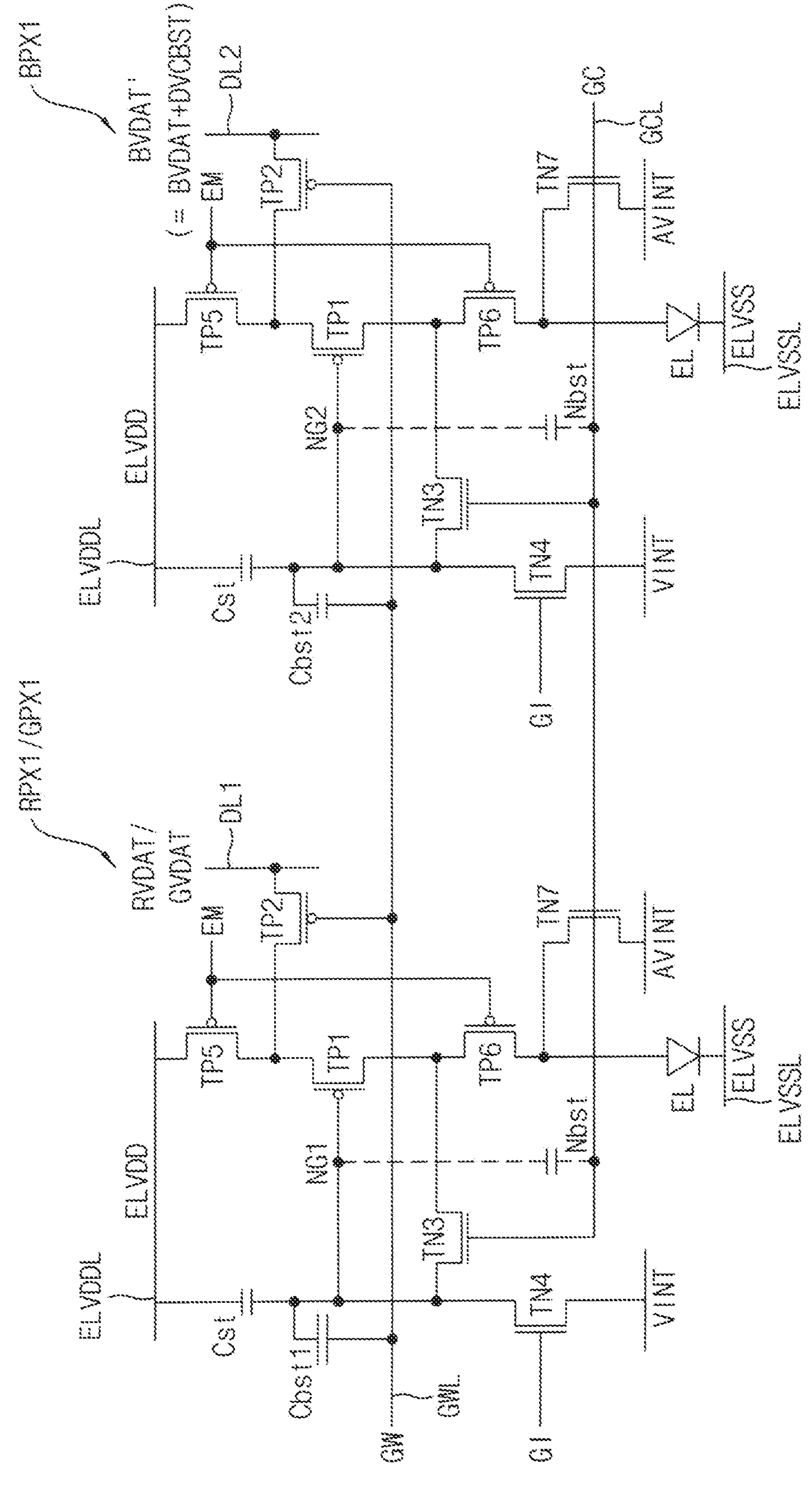
FIG. 4 is a circuit diagram illustrating an example of a red/green pixel and a blue pixel included in a display panel according to embodiments.

Each of the red, green and blue pixels may include at least two transistors, at least one capacitor and an organic light emitting diode. For example, as illustrated in FIG. 4, each of the red, green and blue pixels RPX, GPX and BPX may include, but not limited to, first through seventh transistors TP1, TP2, TN3, TN4, TP5, TP6 and TP7, a storage capacitor Cst, a boost capacitor Cbst1 and Cbst2 and an organic light emitting diode EL, where TP stands for a P-type transistor and TN stands for a N-type transistor. Although FIG. 4 illustrates an example where each of the red, green and blue pixels RPX, GPX and BPX has a 7T2C structure having seven transistors and two capacitors, each of the red, green and blue pixels RPX, GPX and BPX in the display panel 100 according to embodiments may include any number of transistors and any number of capacitors.

In some embodiments, each of the red, green and blue pixels RPX, GPX and BPX may be a hybrid oxide polycrystalline (HOP) pixel suitable for low frequency driving for reducing power consumption. In the HOP pixel, one of the at least two transistors may be implemented with a p-type metal-oxide-semiconductor (PMOS) transistor, and another of the at least two transistors may be implemented with an n-type metal-oxide-semiconductor (NMOS) transistor. For example, as illustrated in FIG. 4, in each of the red, green and blue pixels RPX, GPX and BPX, first, second, fifth and sixth transistors TP1, TP2, TP5 and TP6 may be implemented with, but not limited to, PMOS transistors, and third, fourth and seventh transistors TN3, TN4 and TN7 may be implemented with, but not limited to, NMOS transistors. Although FIG. 4 illustrates an example where the seventh transistor TN7 is implemented with the NMOS transistor, in other embodiments, the seventh transistor TN7 may be implemented with the PMOS transistor. In this case, since the third and fourth transistors TN3 and TN4 having terminals (e.g., sources and/or drains) directly coupled to the storage capacitor Cst are implemented with the NMOS transistors, a leakage current through the third and fourth transistors TN3 and TN4 from the storage capacitor Cst may be reduced. However, all the first transistor, the second transistor, the third transistor, the fourth transistor, the fifth transistor, the sixth transistor and the seventh transistor may be implemented with NMOS transistors or PMOS transistors in other embodiments.

The OLED display device including the display panel 100 according to embodiments may perform low frequency driving. Thus, the display panel 100 may be driven at a normal driving frequency (e.g., about 60 Hz), or may be driven at a low frequency lower than the normal driving frequency. For example, the display panel 100 may be driven at the normal driving frequency when displaying a moving image and may be driven at the low frequency when displaying a still image. To drive the display panel 100 at the low frequency, the OLED display device may drive the display panel 100 in at least one frame period of a plurality of consecutive frame periods and may not drive the display panel 100 in the remaining frame periods of the plurality of consecutive frame periods.

For example, as illustrated in FIG. 2, to drive the display panel 100 at a normal driving frequency NDF of about 60 Hz, the OLED display device may drive the display panel 100 in each of first, second, third and fourth frame periods FP1, FP2, FP3 and FP4. Further, to drive the display panel 100 at a low frequency of about 30 Hz, the OLED display device may drive the display panel 100 in each of the first and third frame periods FP1 and FP3 and may not drive the display panel 100 in each of the second and fourth frame periods FP2 and FP4.

In a conventional OLED display device that performs the low frequency driving, in a case where a display panel of the conventional OLED display device is driven at the normal driving frequency NDF, as represented by a luminance graph 210 in FIG. 2, the display panel have substantially the same luminance in each of the first, second, third and fourth frame periods FP1, FP2, FP3 and FP4. However, in the conventional OLED display device, in a case where the display panel of the conventional OLED display device is driven at the low frequency LF, as represented by a luminance graph 230 in FIG. 2, due to a leakage current of at least one transistor (e.g., TN3 and TN4 in FIG. 4) coupled to a storage capacitor (e.g., Cst in FIG. 4), luminance of the display panel in a non-driven frame period (e.g., FP2 and FP4) in which the display panel is not driven may be different from luminance of the display panel in a driven frame period (e.g., FP1 and FP3) in which the display panel is driven.

However, in the display panel 100 according to embodiments, since at least one transistor (e.g., TN3 and TN4 in FIG. 4) coupled to a storage capacitor (e.g., Cst in FIG. 4) is implemented with the NMOS transistor, a leakage current through the at least one transistor connected to the storage capacitor may be reduced. Accordingly, even if the display panel 100 is driven at the low frequency LF, a difference between luminance of the display panel 100 in the non-driven frame period (e.g., FP2 and FP4) and luminance of the display panel 100 in the driven frame period (e.g., FP1 and FP3) may be reduced.

Further, in the display panel 100 according to embodiments, to further reduce the difference between the luminance of the display panel 100 in the non-driven frame period (e.g., FP2 and FP4) and the luminance of the display panel 100 in the driven frame period (e.g., FP1 and FP3), and to reduce a difference between the luminance 210 of the display panel 100 driven at the normal driving frequency NDF and the luminance 230 of the display panel 100 driven at the low frequency LF, a self bias operation that applies a self bias SELF_BIAS to each of the red, green and blue pixels RPX, GPX and BPX may be performed in the non-driven frame period (e.g., FP2 and FP4). For example, in a case where the display panel 100 is driven at the normal driving frequency NDF of about 60 Hz, the OLED display device may apply an initialization bias VINT_BIAS using an initialization voltage (e.g., an initialization voltage VINT in FIG. 4) to a driving transistor (e.g., a first transistor TP1 in FIG. 4) of each of the red, green and blue pixels RPX, GPX and BPX in each of the first, second, third and fourth frame periods FP1, FP2, FP3 and FP4. Further, in a case where the display panel 100 is driven at the low frequency LF of about 30 Hz, the OLED display device may apply the initialization bias VINT_BIAS using the initialization voltage (e.g., the initialization voltage VINT in FIG. 4) to the driving transistor (e.g., the first transistor TP1 in FIG. 4) of each of the red, green and blue pixels RPX, GPX and BPX in each of the first and third frame periods FP1 and FP3, and may apply the self bias SELF_BIAS using a data voltage stored in a previous frame period, or in the first frame period FP1 or the third frame period FP3 to the driving transistor (e.g., the first transistor TP1 in FIG. 4) of each of the red, green and blue pixels RPX, GPX and BPX in each of the second and fourth frame periods FP2 and FP4. Accordingly, since the initialization bias VINT_BIAS or the self bias SELF_BIAS is applied to the driving transistor of each pixel RPX, GPX and BPX in each frame period not only in the case where the display panel 100 is driven at the normal driving frequency NDF, but also in the case where the display panel 100 is driven at the low frequency LF, in the display panel 110 according to embodiments, the difference between the luminance 210 of the display panel 100 driven at the normal driving frequency NDF and the luminance 230 of the display panel 100 driven at the low frequency LF may be reduced compared with a conventional display panel in which the self bias SELF_BIAS is not applied.

Even if the self bias operation using the self bias SELF_BIAS is performed in the non-driven frame period (e.g., FP2 and FP4), in a case where the initialization voltage of the initialization bias VINT_BIAS and the data voltage of the self bias SELF_BIAS have a great difference, or in a case where the initialization voltage is excessively lower than the data voltage, the difference between the luminance 210 of the display panel 100 driven at the normal driving frequency NDF and the luminance 230 of the display panel 100 driven at the low frequency LF may be perceived by a user.

However, in the display panel 100 according to embodiments, the red pixel RPX, the green pixel GPX and the blue pixel BPX may be designed differently such that at least one of the at least two transistors, the at least one capacitor and a parasitic capacitor included in the blue pixel BPX may have a size different from a size of a corresponding one of the at least two transistors, the at least one capacitor and the parasitic capacitor included in the red pixel RPX or the green pixel GPX. The size of the at least one of the at least two transistors, the at least one capacitor and the parasitic capacitor included in the blue pixel BPX may be determined such that a data voltage range for the blue pixel BPX may be adjusted similar to a data voltage range for the red pixel RPX or the green pixel GPX. For example, the size of the at least one of the at least two transistors, the at least one capacitor and/or the parasitic capacitor included in the blue pixel BPX may be determined such that a data voltage range for the blue pixel BPX may have a value between that of the red pixel RPX and the green pixel GPX.

For example, as illustrated in FIG. 3, in a case where the red pixel RPX, the green pixel GPX and the blue pixel BPX have substantially the same sized components (e.g., the at least two transistors, the at least one capacitor, the parasitic capacitor, or the like other than the organic light emitting diode), a data voltage range 330 for the blue pixel BPX may be lower than a data voltage range 310 for the red pixel RPX and a data voltage range 320 for the green pixel GPX, and the initial voltage VINT should be lower by a predetermined margin than a lowest voltage level of the data voltage range 330 for the blue pixel BPX, or a 255-gray voltage BV255 for the blue pixel BPX. For example, a 0-gray voltage RV0 for the red pixel RPX may be about 7 V, a 255-gray voltage RV255 for the red pixel RPX may be about 3 V, the data voltage range 310 for the red pixel RPX may be from about 3 V to about 7 V, a 0-gray voltage GV0 for the green pixel GPX may be about 7.1 V, a 255-gray voltage GV255 for the green pixel GPX may be about 4 V, the data voltage range 320 for the green pixel GPX may be from about 4 V to about 7.1 V, a 0-gray voltage BV0 for the blue pixel BPX may be about 6.5 V, a 255-gray voltage BV255 for the blue pixel BPX may be about 2 V, the data voltage range 330 for the blue pixel BPX may be from about 2 V to about 6.5 V, and the initial voltage VINT may be set as about −3.5 V.

However, in the display panel 100 according to embodiments, the blue pixel BPX may be designed differently from the red pixel RPX and/or the green pixel GPX such that at least one of the at least two transistors, the at least one capacitors and the parasitic capacitor included in the blue pixel BPX may have a size different from a size of a corresponding one of the at least two transistors, the at least one capacitor and the parasitic capacitor included in the red pixel RPX or the green pixel GPX. Accordingly, the data voltage range 330 for the blue pixel BPX may be changed to a data voltage range 350, and the initial voltage VINT corresponding to the data voltage range 330 may be increased to an initial voltage VINT' corresponding to the data voltage range 350. For example, with respect to the blue pixel BPX, the 0-gray voltage BV0 of about 6.5 V may be changed to a 0-gray voltage BV0' of about 7 V, the 255-gray voltage BV255 of about 2 V may be changed to a 255-gray voltage BV255' of about 3 V, and the data voltage range 330 from about 2 V to about 6.5 V may be changed to the data voltage range 350 from about 3 V to about 7 V. In this case, the initial voltage VINT of about −3.5 V corresponding to the data voltage range 330 from about 2 V to about 6.5 V may be increased to the initial voltage VINT' of about −2.5 V corresponding to the data voltage range 350 from about 3 V to about 7 V. Accordingly, a difference between the initialization voltage VINT' of the initialization bias VINT-_BIAS and the data voltage of the self bias SELF_BIAS may be reduced, the difference between the luminance 210 of the display panel 100 driven at the normal driving frequency NDF and the luminance 230 of the display panel 100 driven at the low frequency LF may be reduced, and thus the luminance difference when the driving frequency is changed may not be perceived by the user.

Although FIG. 3 illustrates an example where the blue pixel BPX is designed differently from the red pixel RPX and the green pixel GPX to change the data voltage range 330 for the blue pixel BPX to the data voltage range 350 according to embodiments, any one or more pixels of the red, green and blue pixels RPX, GPX and BPX may be designed differently from one or more other pixels. For example, each of the red pixel RPX and the blue pixel BPX may be designed differently from the green pixel GPX such that the data voltage range 310 for the red pixel RPX is changed similar to the data voltage range 320 for the green pixel GPX and the data voltage range 330 for the blue pixel BPX is changed similar to the data voltage range 320 for the green pixel GPX.

As described above, in the display panel 100 according to embodiments, in each of the red, green and blue pixels RPX, GPX and BPX, at least one transistor may be implemented with the PMOS transistor, and at least one another transistor may be implemented with the NMOS transistor. Accordingly, the leakage current in each of the red, green and blue pixels RPX, GPX and BPX at the low frequency driving may be reduced, and a luminance change within each frame period may be reduced. Further, in the display panel 100 according to embodiments, the red pixel RPX, the green pixel GPX and the blue pixel BPX may be differently designed such that at least one of the at least two transistors, the at least one capacitor and the parasitic capacitor included in the blue pixel BPX may have a size different from a size of a corresponding one of the at least two transistors, the at least one capacitor and the parasitic capacitor included in the red pixel RPX or the green pixel GPX. Thus, the data voltage range 350 for the blue pixel BPX may be similar to the data voltage range 310 for the red pixel RPX and the data voltage range 320 for the green pixel GPX, and the initial voltage VINT' may be increased. Accordingly, when a driving frequency for the display panel 100 is changed, a difference between luminance of the display panel 100 driven at a previous driving frequency (e.g., the normal driving frequency NDF) and luminance of the display panel 100 driven at a current driving frequency (e.g., the low frequency LF) may be reduced, and the luminance difference may not be perceived by the user.

FIG. 4 is a circuit diagram illustrating an example of a red/green pixel and a blue pixel included in a display panel according to embodiments.

Referring to FIG. 4, a display panel according to embodiments may include a red pixel RPX1 that emits red light, a green pixel GPX1 that emits green light, and a blue pixel BPX1 that emits blue light. FIG. 4 illustrates the red/green pixel RPX1/GPX1 and the blue pixel BPX1 in the same pixel row. Further, in FIG. 4, although the red/green pixel RPX1/GPX1 and the blue pixel BPX1 have corresponding components, at least one component of the blue pixel BPX1 may have a size different from a size of a corresponding component of the red/green pixel RPX1/GPX1. That is, the red pixel RPX1 and the green pixel GPX1 may be designed substantially identically, and the blue pixel BPX1 may be designed differently (in size) from the red pixel RPX1 and the green pixel GPX1. However, in the display panel according to embodiments, any one or more of the red, green and blue pixels RPX1, GPX1 and BPX1 may be designed different from one or more other pixels.

Each of the red, green and blue pixels RPX1, GPX1 and BPX1 may include a storage capacitor Cst, a boost capacitor Cbst1 or Cbst2, a first transistor TP1, a second transistor TP2, a third transistor TN3, a fourth transistor TN4, a fifth transistor TP5, a sixth transistor TP6, a seventh transistor TN7 and an organic light emitting diode EL.

The storage capacitor Cst may store a data voltage RVDAT, GVDAT and BVDAT' or a compensated data voltage where a threshold voltage of the first transistor TP1 is subtracted from the data voltage RVDAT, GVDAT and BVDAT' transferred through the second transistor TP2 and the (diode-connected) first transistor TP1 from a data line DL1 and DL2. In some embodiments, the storage capacitor Cst may include a first electrode coupled to a first power supply voltage line ELVDDL through which a first power supply voltage ELVDD is transferred, and a second electrode coupled to a gate node NG1 and NG2 of the first transistor TP1.

The boost capacitor Cbst1 and Cbst2 may change a voltage of the gate node NG1 and NG2 when a gate writing signal GW is changed. For example, when the gate writing signal GW is increased from a low level to a high level, the boost capacitor Cbst1 and Cbst2 may increase the voltage of the gate node NG1 and NG2. In some embodiments, the boost capacitor Cbst1 and Cbst2 may include a first electrode coupled to the gate node NG1 and NG2, and a second electrode coupled to a gate writing signal line GWL through which the gate writing signal GW is transferred.

The first transistor TP1 may generate a driving current based on the voltage of the gate node NG1 and NG2, or a voltage of the second electrode of the storage capacitor Cst. The first transistor TP1 may be referred to as a driving transistor for driving the organic light emitting diode EL. In some embodiments, the first transistor TP1 may include a gate electrode coupled to the gate node NG1 and NG2, a first terminal (e.g., a source) coupled to a second terminal of the fifth transistor TP5, and a second terminal (e.g., a drain) coupled to a first terminal of the sixth transistor TP6.

The second transistor TP2 may transfer the data voltage RVDAT, GVDAT and BVDAT' to the source of the first transistor TP1 in response to the gate writing signal GW of the gate writing signal line GWL. The second transistor TP2 may be referred to as a switching transistor or a scan transistor for transferring the data voltage RVDAT, GVDAT and BVDAT' of the data line DL1 and DL2 to the first electrode of the first transistor TP1.

For example, the second transistor TP2 of the red pixel RPX1 may transfer the data voltage RVDAT for the red pixel RPX1 to the source of the first transistor TP1 of the red pixel RPX1, the second transistor TP2 of the green pixel GPX1 may transfer the data voltage GVDAT for the green pixel GPX1 to the source of the first transistor TP1 of the green pixel GPX1, and the second transistor TP2 of the blue pixel BPX1 may transfer the data voltage BVDAT' for the blue pixel BPX1 to the source of the first transistor TP1 of the blue pixel BPX1. In some embodiments, the second transistor TP2 may include a gate electrode coupled to the gate writing signal line GWL through which the gate writing signal GW is transferred, a first terminal coupled to the data line DL1 or DL2, and a second terminal coupled to the source of the first transistor TP1.

The third transistor TN3 may diode-connect the first transistor TP1 in response to a gate compensation signal GC of a gate compensation signal line GCL. The third transistor TN3 may be referred to as a threshold voltage compensating transistor for compensating the threshold voltage of the first transistor TP1. While the gate writing signal GW and the gate compensation signal GC are applied, the data voltage RVDAT, GVDAT and BVDAT' transferred by the second transistor TP2 may be transferred to the storage capacitor Cst through the first transistor TP1 that is diode-connected by the third transistor TN3, and thus the voltage where the threshold voltage of the first transistor TP1 is subtracted from the data voltage RVDAT, GVDAT and BVDAT' may be stored in the storage capacitor Cst. In some embodiments, the third transistor TN3 may include a gate electrode coupled to the gate compensation signal line GCL through which the gate compensation signal GC is transferred, a first terminal coupled to the drain of the first transistor TP1, and a second terminal coupled to the gate node NG1 or NG2.

The fourth transistor TN4 may apply an initialization voltage VINT to the gate node NG1 and NG2 in response to a gate initialization signal GI. The fourth transistor TN4 may be referred to as a gate initializing transistor for initializing the gate node NG1 and NG2, or the first transistor TP1 and the storage capacitor Cst. While the gate initialization signal GI is applied, the fourth transistor TN4 may apply the initialization voltage VINT to the gate node NG1 and NG2, and the first transistor TP1 and the storage capacitor Cst may be initialized due to the initialization voltage VINT applied to the gate node NG1 and NG2. In some embodiments, the fourth transistor TN4 may include a gate electrode receiving the gate initialization signal GI, a first terminal receiving the initialization voltage VINT, and a second terminal coupled to the gate node NG1 or NG2.

The fifth transistor TP5 may couple the first power supply voltage line ELVDDL through which the first power supply voltage ELVDD is transferred and the source of the first transistor TP1 in response to an emission signal EM, and the sixth transistor TP6 may couple the drain of the first transistor TP1 and an anode of the organic light emitting diode EL in response to the emission signal EM. The fifth and sixth transistors TP5 and TP6 may be referred to as emission transistors for allowing the organic light emitting diode EL to emit light. While the emission signal EM is applied, the fifth and sixth transistors TP5 and TP6 may be turned on to form a path of the driving current from the first power supply voltage line ELVDDL through which the first power supply voltage ELVDD is transferred to a second power supply voltage line ELVSSL through which a second power supply voltage ELVSS is transferred. In some embodiments, the fifth transistor TP5 may include a gate electrode receiving the emission signal EM, a first terminal coupled to the first power supply voltage line ELVDDL through which the first power supply voltage ELVDD is transferred, and a second terminal coupled to the source of the first transistor TP1, and the sixth transistor TP6 may include a gate electrode receiving the emission signal EM, a first terminal coupled to the drain of the first transistor TP1, and a second terminal coupled to the anode of the organic light emitting diode EL.

The seventh transistor TN7 may apply an anode initialization voltage AVINT to the anode of the organic light emitting diode EL in response to the gate compensation signal GC. According to embodiments, the anode initialization voltage AVINT may be substantially the same as the initialization voltage VINT or may be different from the initialization voltage VINT. The seventh transistor TN7 may be referred to as a diode initializing transistor for initializing the organic light emitting diode EL. While the gate compensation signal GC is applied, the seventh transistor TN7 may initialize the organic light emitting diode EL by using the anode initialization voltage AVINT. In some embodiments, the seventh transistor TN7 may include a gate electrode coupled to the gate compensation signal line GCL through which the gate compensation signal GC is transferred, a first terminal receiving the anode initialization voltage AVINT, and a second terminal coupled to the anode of the organic light emitting diode EL.

The organic light emitting diode EL may emit light based on the driving current generated by the first transistor TP1. While the emission signal EM is applied, the driving current generated by the first transistor TP1 may be provided to the organic light emitting diode EL, and the organic light emitting diode EL may emit light based on the driving current. In some embodiments, the organic light emitting diode EL may include the anode coupled to the second terminal of the sixth transistor TP6, and a cathode coupled to the second power supply voltage line ELVSSL through which the second power supply voltage ELVSS is transferred.

In some embodiments, in each of the red, green and blue pixels RPX1, GPX1 and BPX1, a negative parasitic boost capacitor Nbst may be formed between the gate compensation signal line GCL and the gate node NG1 and NG2, or the gate electrode of the first transistor TP1. When the gate compensation signal GC of the gate compensation signal line GCL is changed, the voltage of the gate node NG1 and NG2 may be changed by the negative parasitic boost capacitor Nbst. For example, when the gate compensation signal GC is decreased from a high level to a low level, the voltage of the gate node NG1 and NG2 may be decreased by the negative parasitic boost capacitor Nbst. However, the decrease of the voltage of the gate node NG1 and NG2 by the negative parasitic boost capacitor Nbst may be compensated by the boost capacitor Cbst1 and Cbst2.

In some embodiments, as illustrated in FIG. 4, the first, second, fifth and sixth transistors TP1, TP2, TP5 and TP6 may be implemented with PMOS transistors, and the third, fourth and seventh transistors TN3, TN4 and TN7 may be implemented with NMOS transistors. Thus, the gate writing signal GW and the emission signal EM applied to the second, fifth and sixth transistors TP2, TP5 and TP6 may be active low signals, and the gate compensation signal GC and the gate initialization signal GI applied to the third, fourth and seventh transistors TN3, TN4 and TN7 may be active high signals. Since the third and fourth transistors TN3 and TN4 directly coupled to the storage capacitor Cst are implemented with the NMOS transistors, a leakage current through the third and fourth transistors TN3 and TN4 from the storage capacitor Cst may be reduced.

In the display panel according to some embodiments, the boost capacitor Cbst2 included in the blue pixel BPX1 may have a capacitance lower than a capacitance of the boost capacitor Cbst1 included in the red/green pixel RPX1/GPX1. For example, the boost capacitor Cbst1 of the red/green pixel RPX1/GPX1 may have a capacitance of about 7 fF, the boost capacitor Cbst2 of the blue pixel BPX1 may have a capacitance of about 5 fF, but the capacitances of the boost capacitors Cbst1 and Cbst2 are not limited thereto. Thus, a second boost amount (or a second increase amount) of the voltage of the gate node NG2 caused by the boost capacitor Cbst2 in the blue pixel BPX1 may be reduced compared with a first boost amount (or a first increase amount) of the voltage of the gate node NG1 caused by the boost capacitor Cbst1 in the red/green pixel RPX1/GPX1. Accordingly, the data voltage BVDAT' for the blue pixel BPX1 may be determined or set by considering a difference between the first boost amount and the second boost amount. For example, the data voltage BVDAT' for the blue pixel BPX1 may be determined or set by adding a boost voltage difference DVCBST corresponding to the difference between the first boost amount and the second boost amount to a conventional data voltage BVDAT in a case where the blue pixel BPX1 is designed substantially identically to the red/green pixel RPX1/GPX1. Accordingly, as illustrated in FIG. 3, a data voltage range 330 for the blue pixel BPX1 may be increased to a data voltage range 350, and the initial voltage VINT corresponding to the data voltage range 330 may be increased to the initial voltage VINT' corresponding to the data voltage range 350. Accordingly, a difference between the initialization voltage VINT' of an initialization bias and the data voltage RVDAT, GVDAT and BVDAT of a self bias may be reduced, a difference between a luminance of the display panel driven at a normal driving frequency and a luminance of the display panel driven at a low frequency may be reduced, and thus the luminance difference when a driving frequency for the display panel is changed may not be perceived by a user.

Hereinafter, an example of an operation of each of the red, green and blue pixels RPX1, GPX1 and BPX1 will be described below with reference to FIGS. 4 through 8.

Figure 5:
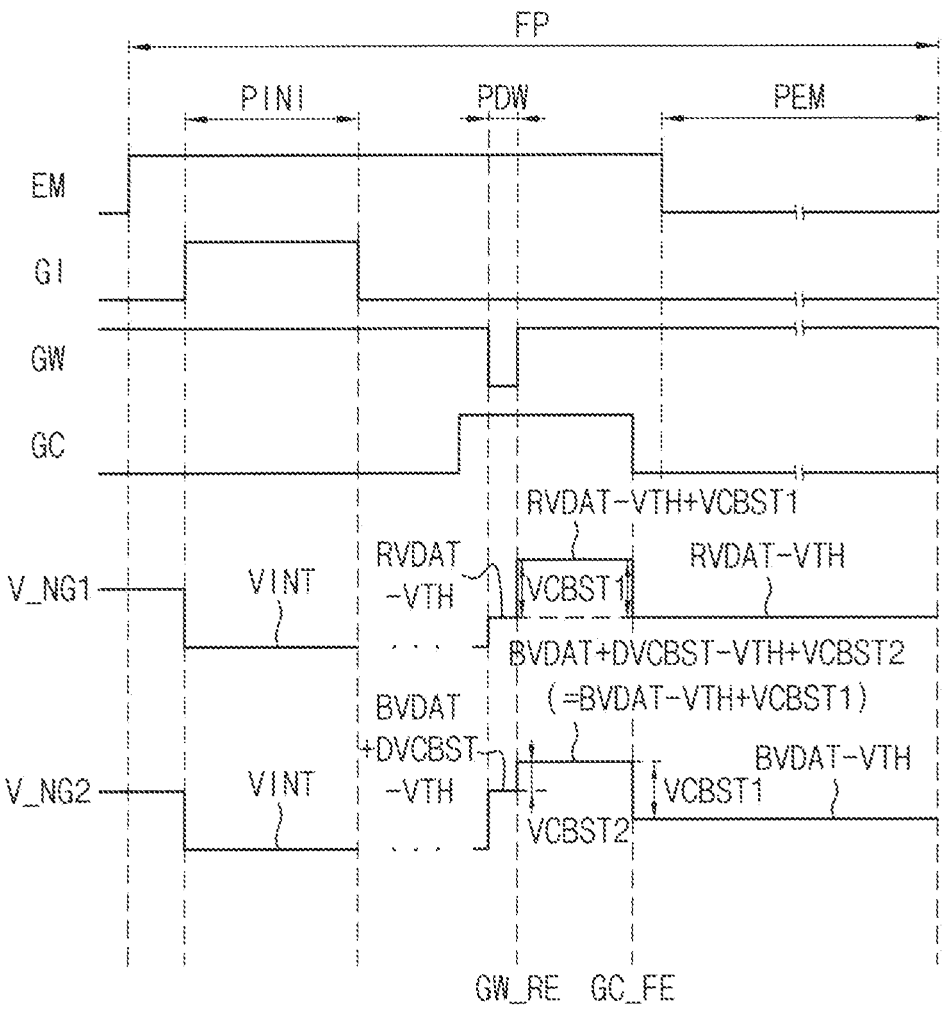
FIG. 5 is a timing diagram for describing an example of an operation of a pixel included in a display panel according to embodiments.
Figure 6:
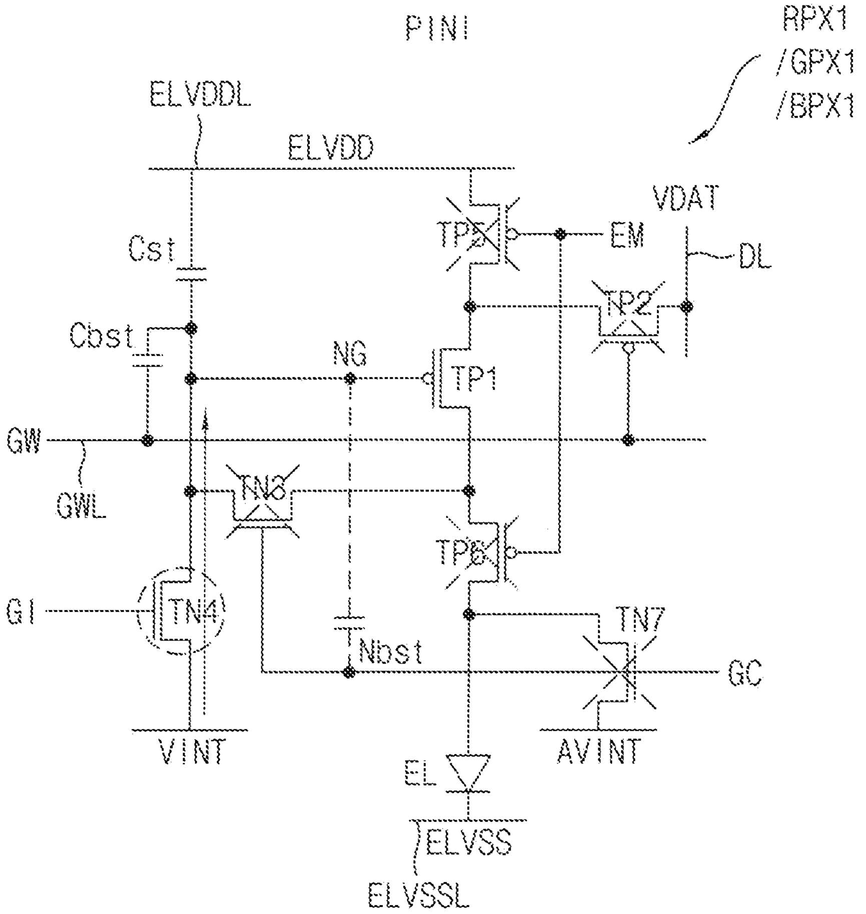
FIG. 6 is a circuit diagram for describing an example of an operation of a pixel in an initialization period.
Figure 7:
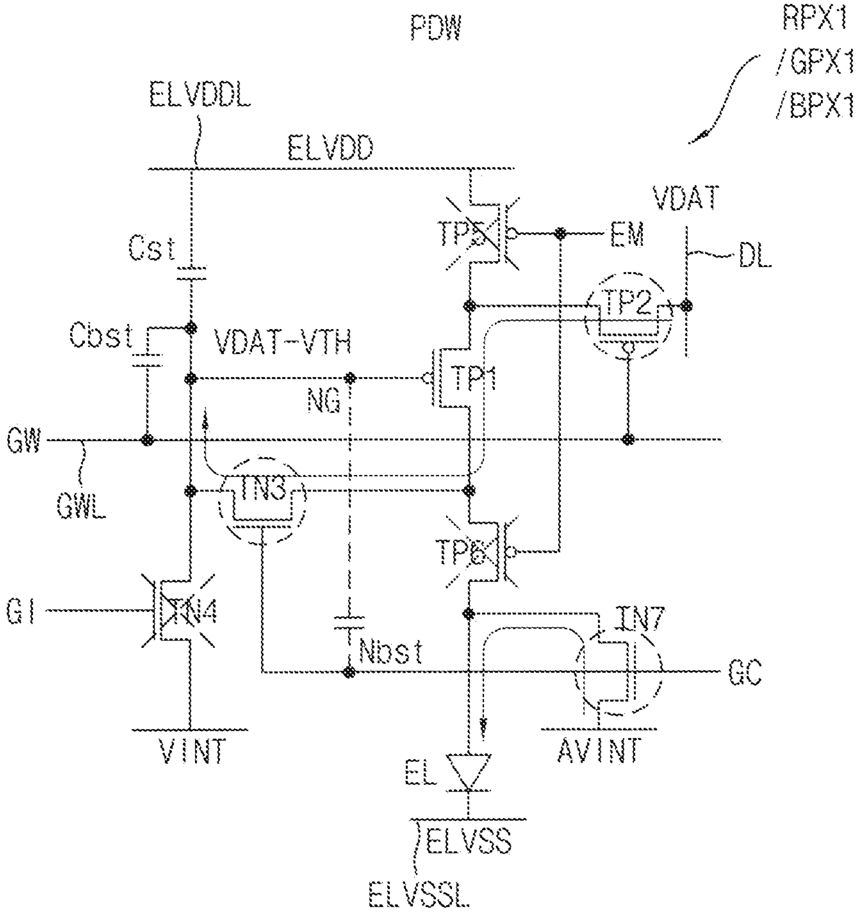
FIG. 7 is a circuit diagram for describing an example of an operation of a pixel in a data writing period.
Figure 8:
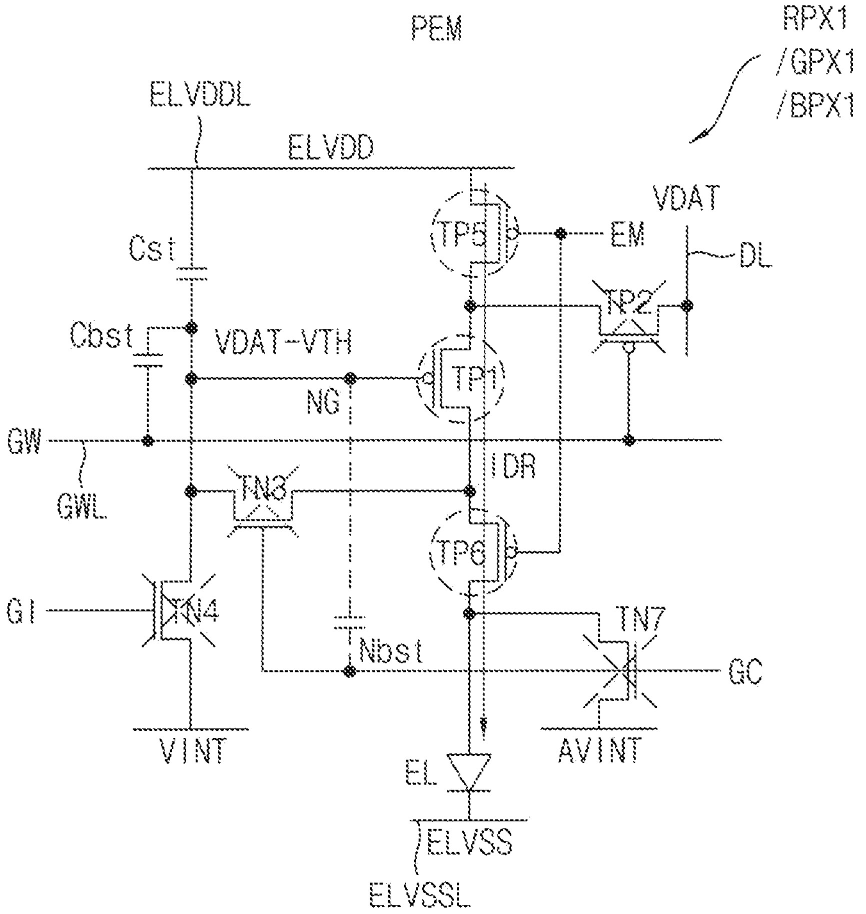
FIG. 8 is a circuit diagram for describing an example of an operation of a pixel in an emission period.

FIG. 5 is a timing diagram for describing an example of an operation of a pixel included in a display panel according to embodiments, FIG. 6 is a circuit diagram for describing an example of an operation of a pixel in an initialization period, FIG. 7 is a circuit diagram for describing an example of an operation of a pixel in a data writing period, and FIG. 8 is a circuit diagram for describing an example of an operation of a pixel in an emission period.

Referring to FIGS. 4 and 5, a frame period FP for each of the red, green and blue pixels RPX1, GPX1 and BPX1 may include an initialization period PINI, a data writing period PDW and an emission period PEM.

In the initialization period PINI, as illustrated in FIG. 6, the gate node NG may be initialized. In the initialization period PINI, the emission signal EM, the gate writing signal GW and the gate compensation signal GC may have off levels, and the gate initialization signal GI may have an on level. As illustrated in FIG. 6, in each of the red, green and blue pixels RPX1, GPX1 and BPX1, the fourth transistor TN4 may be turned on in response to the gate initialization signal GI having the on level. Thus, the fourth transistor TN4 may apply the initialization voltage VINT to the gate node NG, and thus the gate node NG, or the first transistor TP1 and the storage capacitor Cst may be initialized.

In the data writing period PDW, as illustrated in FIG. 7, the voltage VDAT-VTH where the threshold voltage VTH of the first transistor TP1 is subtracted from the data voltage VDAT may be stored in the storage capacitor Cst. In the data writing period PDW, the emission signal EM and the gate initialization signal GI may have the off levels, and the gate writing signal GW and the gate compensation signal GC may have the on levels. As illustrated in FIG. 7, in each of the red, green and blue pixels RPX1, GPX1 and BPX1, the second and third transistors TP2 and TN3 may be turned on in response to the gate writing signal GW having the on level and the gate compensation signal GC having the on level. Thus, the second transistor TP2 may transfer the data voltage VDAT of the data line DL to the source of the first transistor TP1. Further, the third transistor TN3 may be turned on to diode-connect the first transistor TP1, and thus the voltage VDAT-VTH where the threshold voltage VTH is subtracted from the data voltage VDAT may be stored in the storage capacitor Cst through the diode-connected first transistor TP1. Further, as illustrated in FIG. 7, in each of the red, green and blue pixels RPX1, GPX1 and BPX1, the seventh transistors TN7 may be turned on in response to the gate compensation signal GC having the on level. Thus, the seven transistor TN7 may apply the anode initialization voltage AVINT to the anode of the organic light emitting diode EL, and thus the anode of the organic light emitting diode EL may be initialized.

In some embodiments, the boost capacitor Cbst2 included in the blue pixel BPX1 may have a capacitance lower than a capacitance of the boost capacitor Cbst1 included in the red/green pixel RPX1/GPX1. Thus, at a rising edge GW_RE of the gate writing signal GW, a second boost amount VCBST2 of the voltage V_NG2 of the gate node NG2 caused by the boost capacitor Cbst2 in the blue pixel BPX1 may be reduced compared with a first boost amount VCBST1 of the voltage V_NG1 of the gate node NG1 caused by the boost capacitor Cbst1 in the red/green pixel RPX1/GPX1. Accordingly, the data voltage BVDAT' for the blue pixel BPX1 may be determined or set by adding a boost voltage difference DVCBST corresponding to a difference between the first boost amount VCBST1 and the second boost amount VCBST2 to a conventional data voltage BVDAT for the blue pixel BPX1.

For example, as illustrated in FIGS. 4 and 5, in the red pixel RPX1, the data voltage RVDAT may be provided through the data line DL1, and the voltage RVDAT-VTH where the threshold voltage VTH of the first transistor TP1 is subtracted from the data voltage RVDAT may be stored in the storage capacitor Cst. Further, in the blue pixel BPX1, the data voltage BVDAT+DVCBST where the boost voltage difference DVCBST is added to the conventional data voltage BVDAT may be provided through the data line DL2, and the voltage BVDAT+DVCBST-VTH where the threshold voltage VTH of the first transistor TP1 is subtracted from the data voltage BVDAT+DVCBST may be stored at the storage capacitor Cst. At the rising edge GW_RE of the gate writing signal GW, in the red pixel RPX1, the voltage V_NG1 of the gate node NG1 may be increased by the first boost amount VCBST1, and thus may become the data voltage RVDAT minus the threshold voltage VTH plus the first boost amount VCBST1, or a voltage RVDAT-VTH+VCBST1. Further, at the rising edge GW_RE of the gate writing signal GW in the blue pixel BPX1, the voltage V_NG2 of the gate node NG2 may be increased by the second boost amount VCBST2, and thus may become the conventional data voltage BVDAT plus the boost voltage difference DVCBST minus the threshold voltage VTH plus the second boost amount VCBST2, or a voltage BVDAT+DVCBST-VTH+VCBST2. Since the boost voltage difference DVCBST corresponds to the difference between the first boost amount VCBST1 and the second boost amount VCBST2, the voltage BVDAT+DVCBST-VTH+VCBST2 at the gate node NG2 may correspond to the conventional data voltage BVDAT minus the threshold voltage VTH plus the first boost amount VCBST1, or a voltage BVDAT-VTH+VCBST1.

At a falling edge GC_FE of the gate compensation signal GC, in each of the red, green and blue pixels RPX1, GPX1 and BPX1, by the negative parasitic boost capacitor Nbst, the voltage V_NG1 and V_NG2 of the gate node NG1 and NG2 may be decreased by the first boost amount VCBST1. For example, at the falling edge GC_FE of the gate compensation signal GC, in the red pixel RPX1, the voltage V_NG1 of the gate node NG1 may be decreased by the first boost amount VCBST1 and may become the voltage RVDAT-VTH where the threshold voltage VTH is subtracted from the data voltage RVDAT. Further, at the falling edge GC_FE of the gate compensation signal GC, in the blue pixel BPX1, the voltage V_NG2 of the gate node NG2 may be decreased by the first boost amount VCBST1 and may become the voltage BVDAT-VTH where the threshold voltage VTH is subtracted from the conventional data voltage BVDAT.

In the emission period PEM, the organic light emitting diode EL may emit light. In the emission period PEM, the gate initialization signal GI, the gate writing signal GW and the gate compensation signal GC have the off levels, and the emission signal EM may have the on level. As illustrated in FIG. 8, the fifth and sixth transistors TP5 and TP6 may be turned on in response to the emission signal EM having the on level. The first transistor TP1 may generate the driving current IDR based on the voltage VDAT-VTH of the gate node NG, the fifth and sixth transistors TP5 and TP6 may form the path of the driving current IDR from the first power supply voltage line ELVDDL to the second power supply voltage line ELVSSL, and the organic light emitting diode EL may emit light based on the driving current IDR generated by the first transistor TP1. Thus, since the driving current IDR is generated based on the voltage VDAT-VTH where the threshold voltage VTH is subtracted from the data voltage VDAT, the driving current IDR may be determined based on the data voltage VDAT regardless of the threshold voltage VTH of the first transistor TP1.

Figure 9:
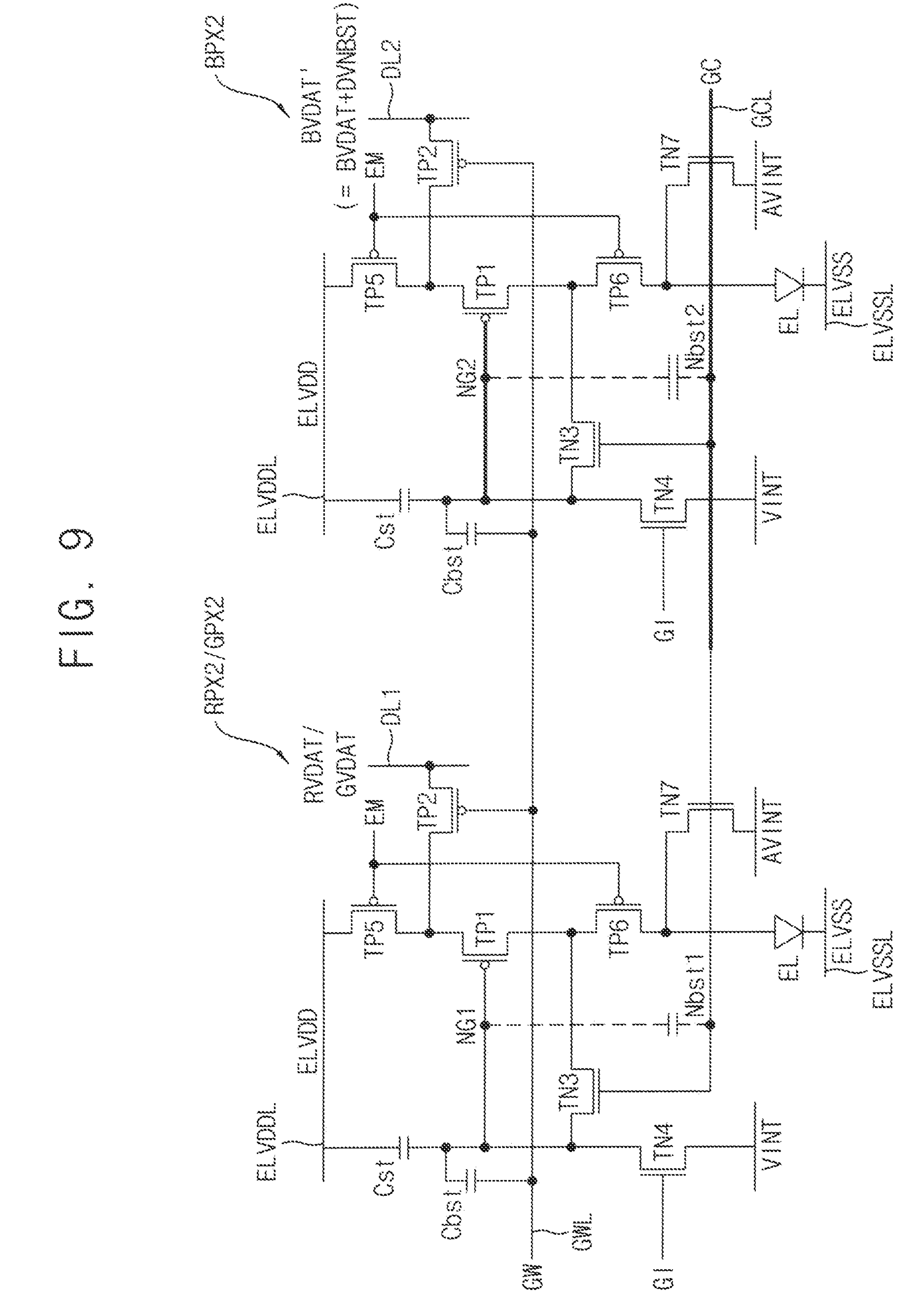
FIG. 9 is a circuit diagram illustrating an example of a red/green pixel and a blue pixel included in a display panel according to embodiments.
Figure 10:
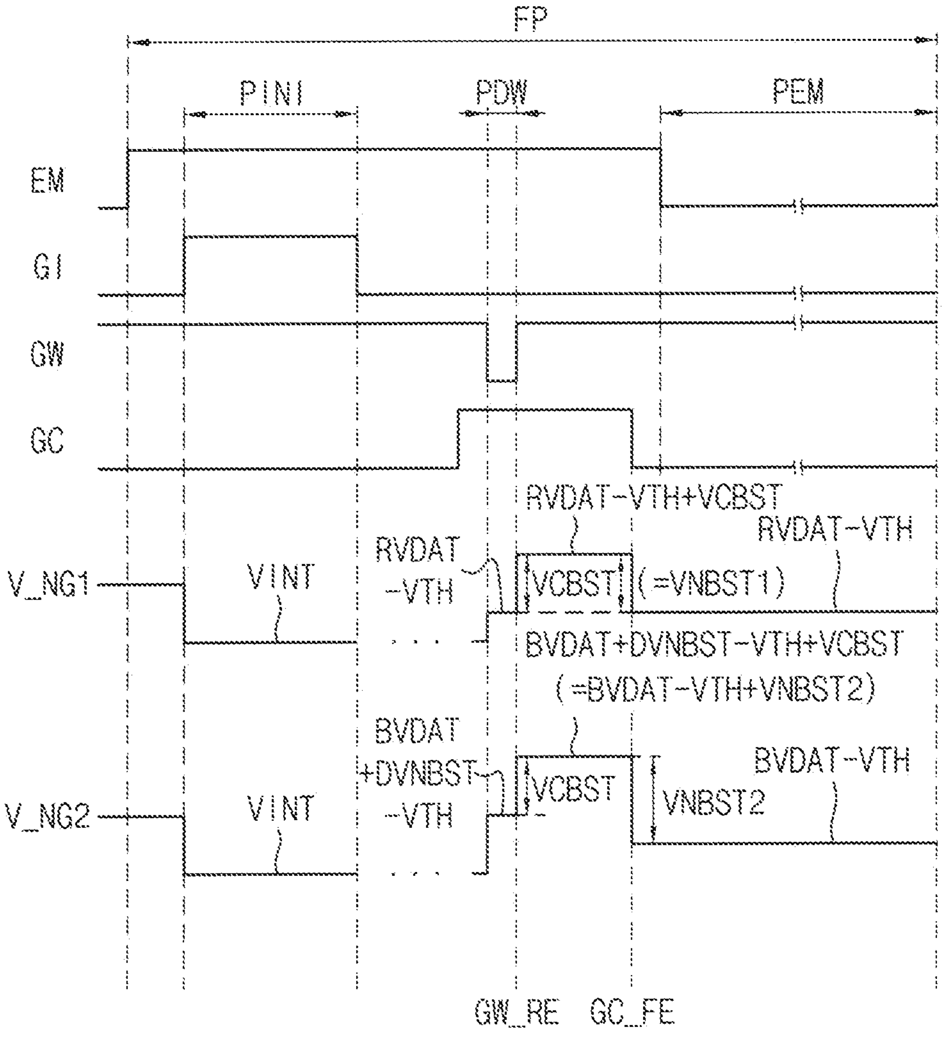
FIG. 10 is a timing diagram for describing an example of an operation of a pixel included in a display panel according to embodiments.

FIG. 9 is a circuit diagram illustrating an example of a red/green pixel and a blue pixel included in a display panel according to embodiments, and FIG. 10 is a timing diagram for describing an example of an operation of a pixel included in a display panel according to embodiments.

Referring to FIG. 9, a display panel according to embodiments may include a red pixel RPX2 that emits red light, a green pixel GPX2 that emits green light, and a blue pixel BPX2 that emits blue light. Each of the red, green and blue pixels RPX2, GPX2 and BPX2 may include a storage capacitor Cst, a boost capacitor Cbst, a first transistor TP1, a second transistor TP2, a third transistor TN3, a fourth transistor TN4, a fifth transistor TP5, a sixth transistor TP6, a seventh transistor TN7 and an organic light emitting diode EL. In some embodiments, each of the red, green and blue pixels RPX2, GPX2 and BPX2 may further include a negative parasitic boost capacitor Nbst1 and Nbst2 between a gate compensation signal line GCL and a gate node NG1 and NG2, or a gate electrode of the first transistor TP1. The red, green and blue pixels RPX2, GPX2 and BPX2 illustrated in FIG. 9 may have similar configurations and similar operations to red, green and blue pixels RPX1, GPX1 and BPX1 illustrated in FIG. 4 except that a size of the negative parasitic boost capacitor Nbst2 of the blue pixel BPX2 is different from a size of the negative parasitic boost capacitor Nbst1 of the red/green pixel RPX2/GPX2 and the boost capacitor Cbst of the blue pixel BPX2 and the boost capacitor Cbst of the red/green pixel RPX2/GPX2 have the same size.

In the display panel according to embodiments, the negative parasitic boost capacitor Nbst2 included in the blue pixel BPX2 may have a capacitance higher than a capacitance of the negative parasitic boost capacitor Nbst1 included in the red/green pixel RPX2/GPX2. For example, the negative parasitic boost capacitor Nbst1 included in the red/green pixel RPX2/GPX2 may have a capacitance of about 3 fF, the negative parasitic boost capacitor Nbst2 included in the blue pixel BPX2 may have a capacitance of about 4 fF, but the capacitances of the negative parasitic boost capacitors Nbst1 and Nbst2 are not limited thereto. Thus, (an absolute value of) a second negative boost amount (or a second decrease amount) of a voltage of the gate node NG2 caused by the negative parasitic boost capacitor Nbst2 in the blue pixel BPX2 may be increased compared with (an absolute value of) a first negative boost amount (or a first decrease amount) of a voltage of the gate node NG1 caused by the negative parasitic boost capacitor Nbst1 in the red/green pixel RPX2/GPX2. Accordingly, the data voltage BVDAT' for the blue pixel BPX2 may be determined or set by considering a difference between the first negative boost amount and the second negative boost amount. For example, the data voltage BVDAT' for the blue pixel BPX2 may be determined or set by adding a negative boost voltage difference DVNBST corresponding to the difference between the first negative boost amount and the second negative boost amount to a conventional data voltage BVDAT in a case where the blue pixel BPX2 is designed substantially identically to the red/green pixel RPX2/GPX2. Accordingly, as illustrated in FIG. 3, a data voltage range 330 for the blue pixel BPX2 may be increased to a data voltage range 350, and the initial voltage VINT corresponding to the data voltage range 330 may be increased to the initial voltage VINT' corresponding to the data voltage range 350. Accordingly, a difference between the initialization voltage VINT' of an initialization bias and the data voltage RVDAT, GVDAT and BVDAT of a self bias may be reduced, a difference between luminance of the display panel driven at a normal driving frequency and luminance of the display panel driven at a low frequency may be reduced, and thus the luminance difference when a driving frequency for the display panel is changed may not be perceived by a user.

For example, as illustrated in FIG. 10, at a rising edge GW_RE of a gate writing signal GW in the red pixel RPX2, the voltage V_NG1 of the gate node NG1 may be increased by the boost amount VCBST, and thus may become the data voltage RVDAT minus a threshold voltage VTH plus the boost amount VCBST, or a voltage RVDAT-VTH+VCBST. Further, at the rising edge GW_RE of the gate writing signal GW, in the blue pixel BPX2, the voltage V_NG2 of the gate node NG2 may be increased by the boost amount VCBST, and thus may become the conventional data voltage BVDAT plus the negative boost voltage difference DVNBST minus the threshold voltage VTH plus the boost amount VCBST, or a voltage BVDAT+DVNBST-VTH+VCBST. Since the boost voltage difference DVNBST corresponds to the difference between the first negative boost amount VNBST1 caused by the negative parasitic boost capacitor Nbst1 in the red pixel RPX2 and the second negative boost amount VNBST2 caused by the negative parasitic boost capacitor Nbst2 in the blue pixel BPX2, the voltage BVDAT+DVNBST-VTH+VCBST at the gate node NG2 may correspond to the conventional data voltage BVDAT minus the threshold voltage VTH plus the second negative boost amount VNBST2, or a voltage BVDAT-VTH+VNBST2.

At a falling edge GC_FE of a gate compensation signal GC, in the red pixel RPX2, the voltage V_NG1 of the gate node NG1 may be decreased by the first negative boost amount VNBST1 (corresponding to the boost amount VCBST) by the negative parasitic boost capacitor Nbst1 and may become the voltage RVDAT-VTH where the threshold voltage VTH is subtracted from the data voltage RVDAT. Further, at the falling edge GC_FE of the gate compensation signal GC, in the blue pixel BPX2, the voltage V_NG2 of the gate node NG2 may be decreased by the second negative boost amount VNBST2 by the negative parasitic boost capacitor Nbst2 and may become the voltage BVDAT-VTH where the threshold voltage VTH is subtracted from the conventional data voltage BVDAT.

In some embodiments, a width of the gate compensation signal line GCL in the blue pixel BPX2 may be greater than a width of the gate compensation signal line GCL in the red/green pixel RPX2/GPX2 such that the negative parasitic boost capacitor Nbst2 included in the blue pixel BPX2 may have a capacitance higher than a capacitance of the negative parasitic boost capacitor Nbst1 included in the red/green pixel RPX2/GPX2. In other embodiments, an area of an electrode of the gate node NG2, or a gate electrode of the first transistor TP1 in the blue pixel BPX2 may be greater than an area of the gate node NG1, or a gate electrode of the first transistor TP1 in the red/green pixel RPX2/GPX2 such that the negative parasitic boost capacitor Nbst2 included in the blue pixel BPX2 may have a capacitance higher than a capacitance of the negative parasitic boost capacitor Nbst1 included in the red/green pixel RPX2/GPX2. In still other embodiments, the width of the gate compensation signal line GCL in the blue pixel BPX2 may be greater than the width of the gate compensation signal line GCL in the red/green pixel RPX2/GPX2, and the area of the gate electrode of the first transistor TP1 in the blue pixel BPX2 may be greater than the area of the gate electrode of the first transistor TP1 in the red/green pixel RPX2/GPX2.

Figure 11:
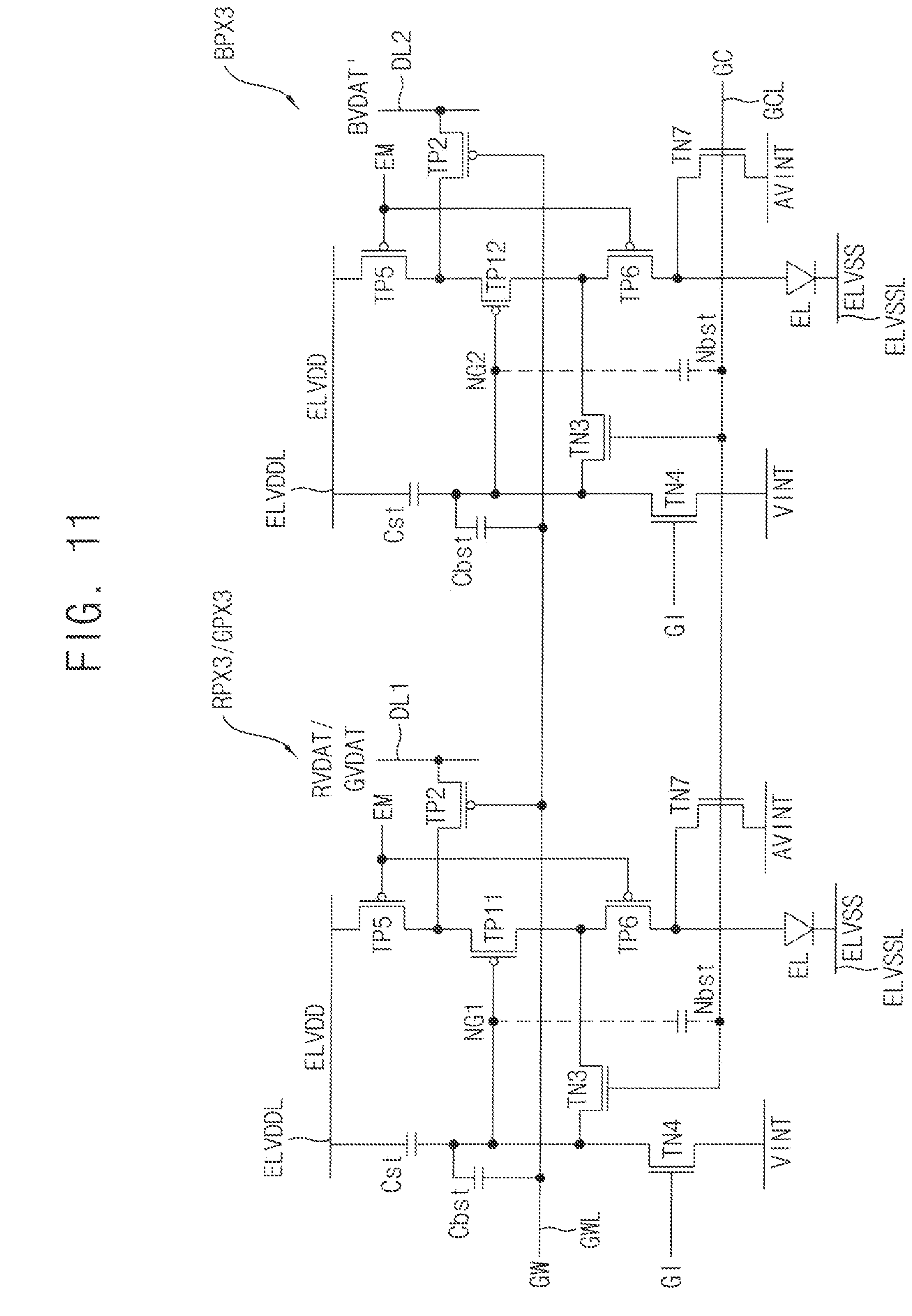
FIG. 11 is a circuit diagram illustrating an example of a red/green pixel and a blue pixel included in a display panel according to embodiments.

FIG. 11 is a circuit diagram illustrating an example of a red/green pixel and a blue pixel included in a display panel according to embodiments.

Referring to FIG. 11, a display panel according to embodiments may include a red pixel RPX3 that emits red light, a green pixel GPX3 that emits green light, and a blue pixel BPX3 that emits blue light. Each of the red, green and blue pixels RPX3, GPX3 and BPX3 may include a storage capacitor Cst, a boost capacitor Cbst, a first transistor TP11 and TP12, a second transistor TP2, a third transistor TN3, a fourth transistor TN4, a fifth transistor TP5, a sixth transistor TP6, a seventh transistor TN7 and an organic light emitting diode EL. The red, green and blue pixels RPX3, GPX3 and BPX3 illustrated in FIG. 11 may have similar configurations and similar operations to red, green and blue pixels RPX1, GPX1 and BPX1 illustrated in FIG. 4, except that a size of the first transistor TP12 of the blue pixel BPX3 is different from a size of the first transistor TP11 of the red/green pixel RPX3/GPX3.

In the display panel according to embodiments, a ratio of a channel width to a channel length of the first transistor TP12 in the blue pixel BPX3 may be greater than a ratio of a channel width to a channel length of the first transistor TP11 in the red/green pixel RPX3/GPX3. Thus, a driving characteristic of the first transistor TP12 of the blue pixel BPX3 may be different from the first transistor TP11 of the red pixel RPX3 and the green pixel GPX3. Accordingly, as illustrated in FIG. 3, a data voltage range 330 for the blue pixel BPX3 may be increased to a data voltage range 350, and the initial voltage VINT corresponding to the data voltage range 330 may be increased to the initial voltage VINT' corresponding to the data voltage range 350. Further, accordingly, a difference between the initialization voltage VINT' of an initialization bias and a data voltage RVDAT, GVDAT and BVDAT of a self bias may be reduced, a difference between a luminance of the display panel driven at a normal driving frequency and a luminance of the display panel driven at a low frequency may be reduced, and thus the luminance difference when a driving frequency for the display panel is changed may not be perceived by a user.

In some embodiments, the channel width of the first transistor TP12 in the blue pixel BPX3 may be greater than the channel width of the first transistor TP11 in the red/green pixel RPX3/GPX3 such that the ratio of the channel width to the channel length of the first transistor TP12 in the blue pixel BPX3 may be greater than the ratio of the channel width to the channel length of the first transistor TP11 in the red/green pixel RPX3/GPX3. In other embodiments, the channel length of the first transistor TP12 in the blue pixel BPX3 may be less than the channel length of the first transistor in the red/green pixel RPX3/GPX3 such that the ratio of the channel width to the channel length of the first transistor TP12 in the blue pixel BPX3 may be greater than the ratio of the channel width to the channel length of the first transistor TP11 in the red/green pixel RPX3/GPX3. In still other embodiments, the channel width of the first transistor TP12 in the blue pixel BPX3 may be greater than the channel width of the first transistor TP11 in the red/green pixel RPX3/GPX3, and the channel length of the first transistor TP12 in the blue pixel BPX3 may be less than the channel length of the first transistor in the red/green pixel RPX3/GPX3.

Figure 12:
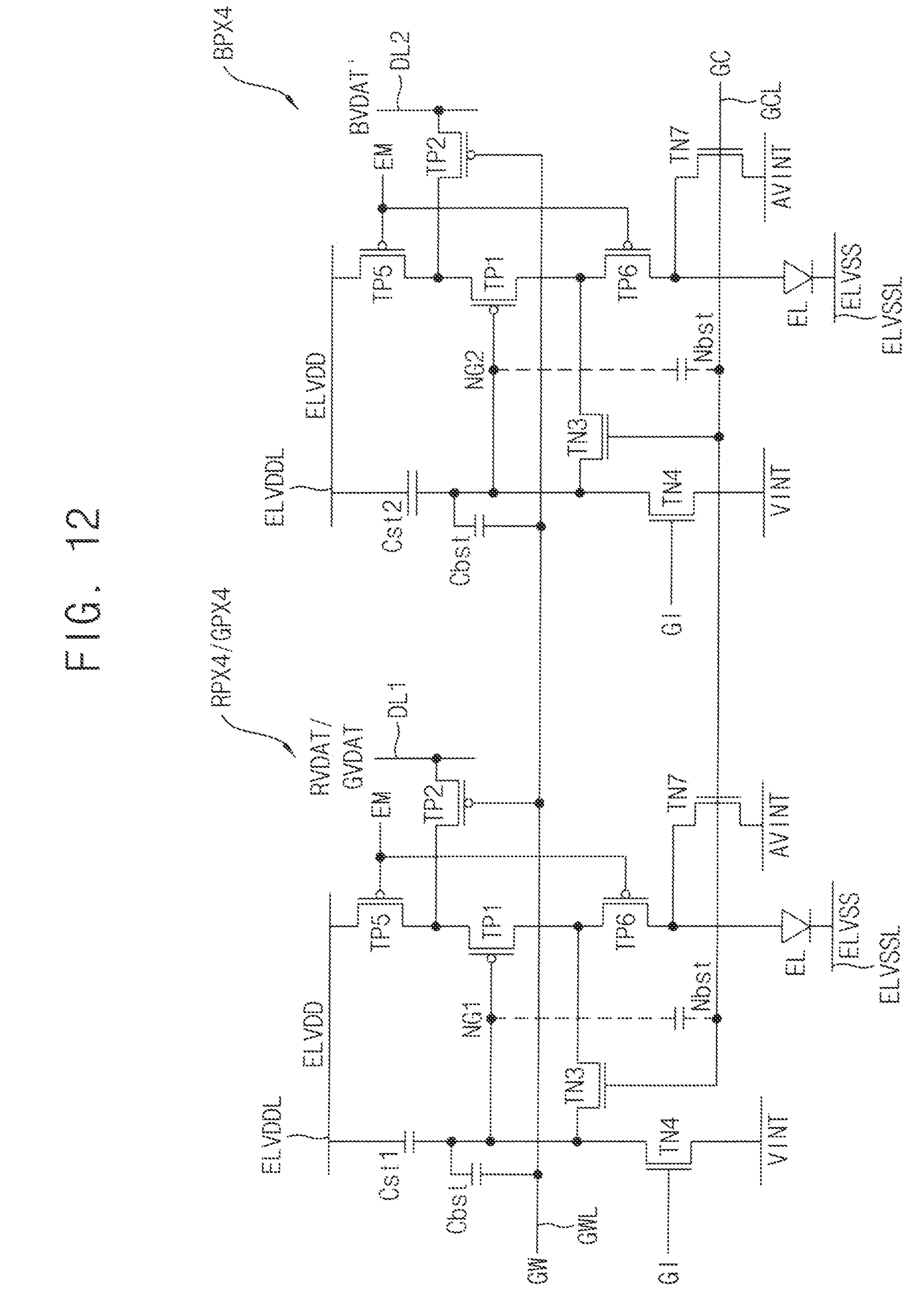
FIG. 12 is a circuit diagram illustrating an example of a red/green pixel and a blue pixel included in a display panel according to embodiments.

FIG. 12 is a circuit diagram illustrating an example of a red/green pixel and a blue pixel included in a display panel according to embodiments.

Referring to FIG. 12, a display panel according to embodiments may include a red pixel RPX4 that emits red light, a green pixel GPX4 that emits green light, and a blue pixel BPX4 that emits blue light. Each of the red, green and blue pixels RPX4, GPX4 and BPX4 may include a storage capacitor Cst1 and Cst2, a boost capacitor Cbst, a first transistor TP1, a second transistor TP2, a third transistor TN3, a fourth transistor TN4, a fifth transistor TP5, a sixth transistor TP6, a seventh transistor TN7 and an organic light emitting diode EL. The red, green and blue pixels RPX4, GPX4 and BPX4 illustrated in FIG. 12 may have similar configurations and similar operations to red, green and blue pixels RPX1, GPX1 and BPX1 illustrated in FIG. 4 except that a size of the storage capacitor Cst2 of the blue pixel BPX4 is different from a size of the storage capacitor Cst1 of the red/green pixel RPX4/GPX4.

In the display panel according to embodiments, the storage capacitor Cst2 included in the blue pixel BPX4 may have a capacitance higher than a capacitance of the storage capacitor Cst1 included in the red/green pixel RPX4/GPX4. Thus, similarly to a difference between the red/green pixel RPX1/GPX1 and the blue pixel BPX1 described in FIG. 4, an effect of the boost capacitor Cbst in the blue pixel BPX4 may be reduced compared with an effect of the boost capacitor Cbst in the red/green pixel RPX4/GPX4. Accordingly, as illustrated in FIG. 3, a data voltage range 330 for the blue pixel BPX4 may be increased to a data voltage range 350, and the initial voltage VINT corresponding to the data voltage range 330 may be increased to the initial voltage VINT' corresponding to the data voltage range 350. Further, accordingly, a difference between the initialization voltage VINT' of an initialization bias and a data voltage RVDAT, GVDAT and BVDAT of a self bias may be reduced, a difference between luminance of the display panel driven at a normal driving frequency and luminance of the display panel driven at a low frequency may be reduced, and thus the luminance difference when a driving frequency for the display panel is changed may not be perceived by a user.

Figure 13:
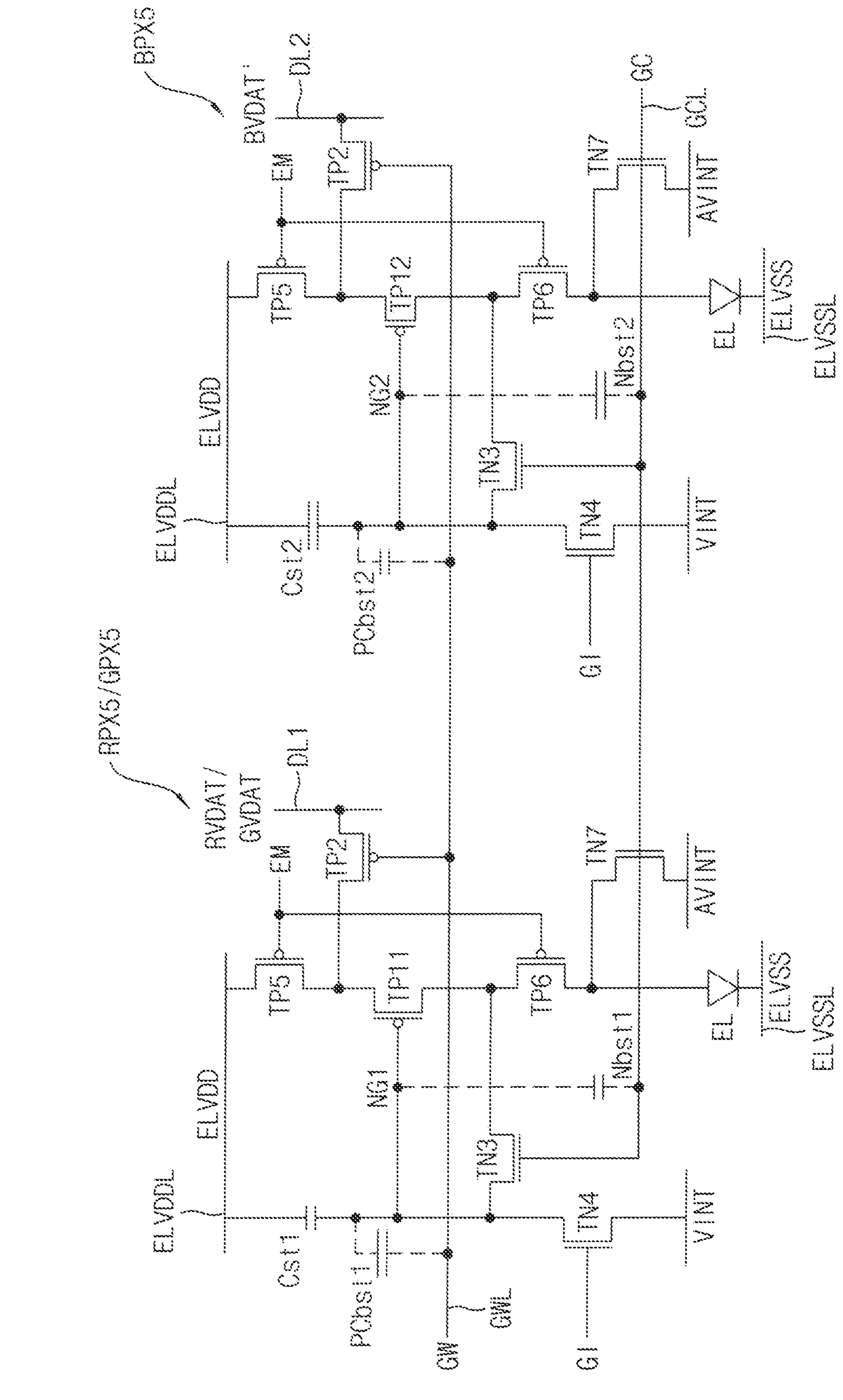
FIG. 13 is a circuit diagram illustrating an example of a red/green pixel and a blue pixel included in a display panel according to embodiments.

FIG. 13 is a circuit diagram illustrating an example of a red/green pixel and a blue pixel included in a display panel according to embodiments.

Referring to FIG. 13, a display panel according to embodiments may include a red pixel RPX5 that emits red light, a green pixel GPX5 that emits green light, and a blue pixel BPX5 that emits blue light. Each of the red, green and blue pixels RPX5, GPX5 and BPX5 may include a storage capacitor Cst1 and Cst2, a first transistor TP11 and TP12, a second transistor TP2, a third transistor TN3, a fourth transistor TN4, a fifth transistor TP5, a sixth transistor TP6, a seventh transistor TN7 and an organic light emitting diode EL. In some embodiments, each of the red, green and blue pixels RPX5, GPX5 and BPX5 may further include a parasitic boost capacitor PCbst1 and PCbst2 between a gate writing signal line GWL and a gate electrode of the first transistor TP11 and TP12, and a negative parasitic boost capacitor Nbst1 and Nbst2 between a gate compensation signal line GCL and the gate electrode of the first transistor TP11 and TP12. The red, green and blue pixels RPX5, GPX5 and BPX5 illustrated in FIG. 13 may have similar configurations and similar operations to red, green and blue pixels RPX1, GPX1, BPX1, RPX2, GPX2, BPX2, RPX3, GPX3, BPX3, RPX4, GPX4 and BPX4 illustrated in FIGS. 4, 9, 11 and 12, except that each of the red, green and blue pixels RPX5, GPX5 and BPX5 includes the parasitic boost capacitor PCbst1 and PCbst2 instead of a boost capacitor Cbst1, Cbst2 and Cbst illustrated in FIGS. 4, 9, 11 and 12.

In the display panel according to embodiments, a size of at least one of the parasitic boost capacitor PCbst2, the negative parasitic boost capacitor Nbst2, the first transistor TP12 and the storage capacitor Cst2 included in the blue pixel BPX5 may be different from a size of a corresponding one of the parasitic boost capacitor PCbst1, the negative parasitic boost capacitor Nbst1, the first transistor TP11 and the storage capacitor Cst1 included in the red/green pixel RPX5/GPX5. In some embodiments, the parasitic boost capacitor PCbst2 included in the blue pixel BPX5 may have a capacitance lower than a capacitance of the parasitic boost capacitor PCbst1 included in the red/green pixel RPX5/GPX5. In other embodiments, the negative parasitic boost capacitor Nbst2 included in the blue pixel BPX5 may have a capacitance higher than a capacitance of the negative parasitic boost capacitor Nbst1 included in the red/green pixel RPX5/GPX5. In still other embodiments, a ratio of a channel width to a channel length of the first transistor TP12 in the blue pixel BPX5 may be greater than a ratio of a channel width to a channel length of the first transistor TP11 in the red/green pixel RPX5/GPX5. In still other embodiments, the storage capacitor Cst2 included in the blue pixel BPX5 may have a capacitance higher than a capacitance of the storage capacitor Cst1 included in the red/green pixel RPX5/GPX5. Accordingly, as illustrated in FIG. 3, a data voltage range 330 for the blue pixel BPX5 may be increased to a data voltage range 350, and the initial voltage VINT corresponding to the data voltage range 330 may be increased to the initial voltage VINT' corresponding to the data voltage range 350. Further, accordingly, a difference between the initialization voltage VINT' of an initialization bias and a data voltage RVDAT, GVDAT and BVDAT of a self bias may be reduced, a difference between luminance of the display panel driven at a normal driving frequency and luminance of the display panel driven at a low frequency may be reduced, and thus the luminance difference when a driving frequency for the display panel is changed may not be perceived by a user.

Figure 14:
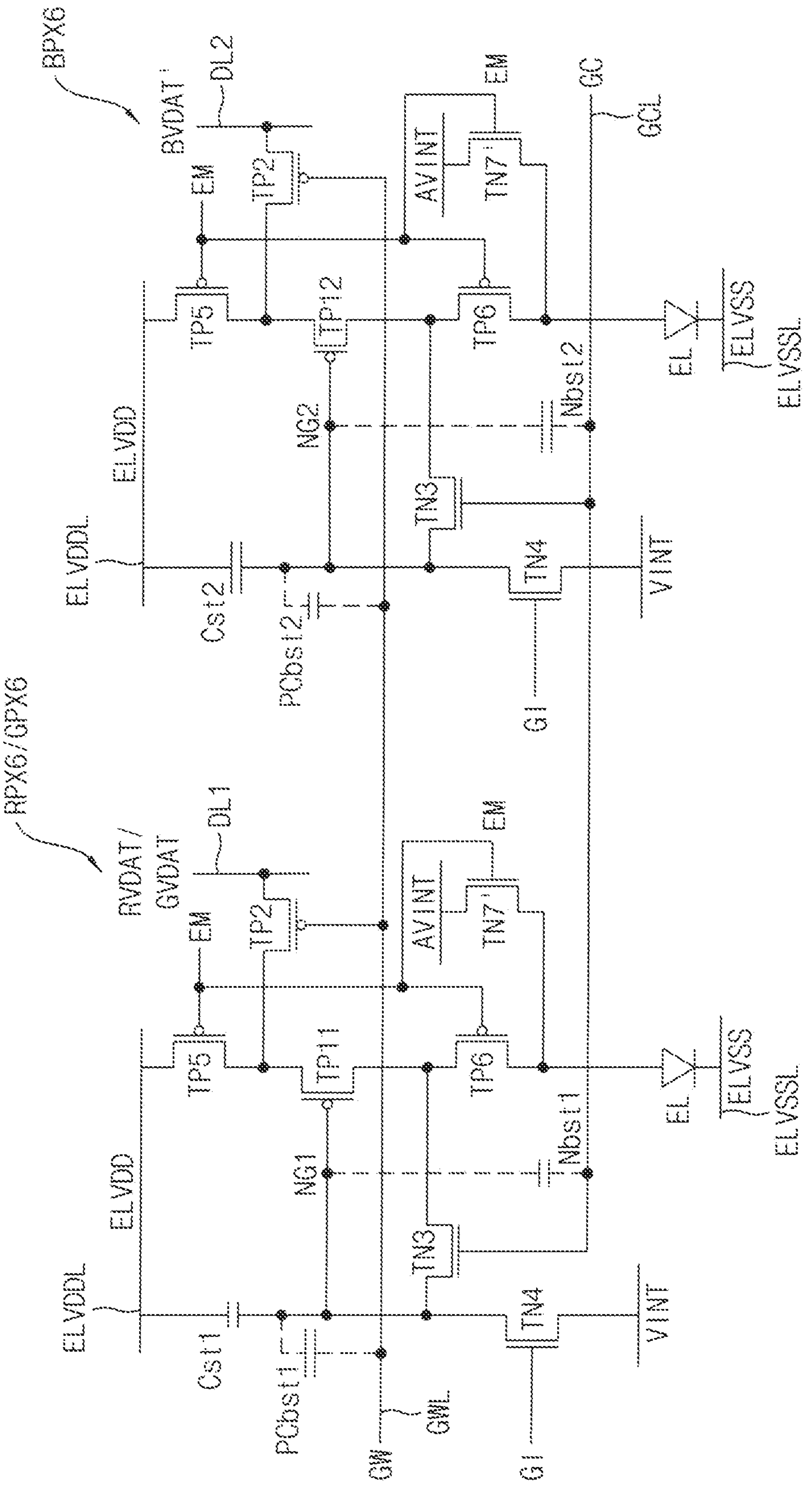
FIG. 14 is a circuit diagram illustrating an example of a red/green pixel and a blue pixel included in a display panel according to embodiments.
Figure 15:
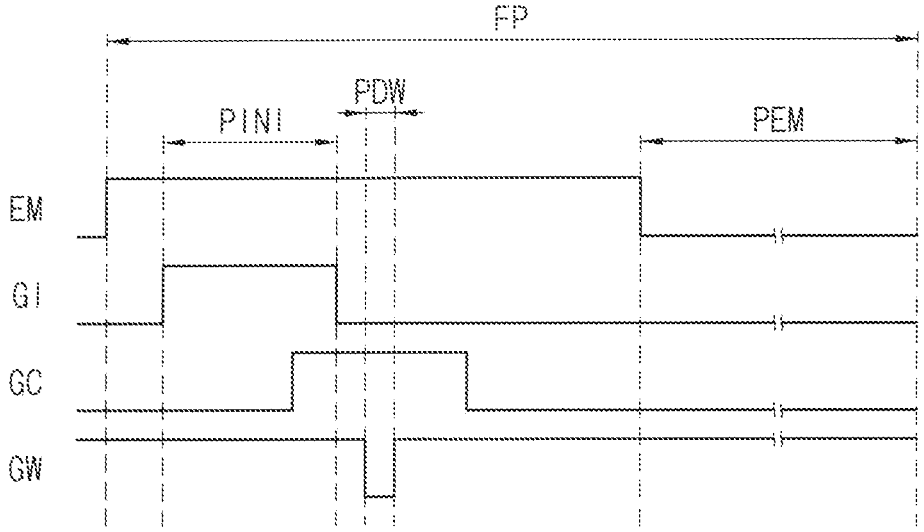
FIG. 15 is a timing diagram for describing an example of an operation of a pixel included in a display panel according to embodiments.

FIG. 14 is a circuit diagram illustrating an example of a red/green pixel and a blue pixel included in a display panel according to embodiments, and FIG. 15 is a timing diagram for describing an example of an operation of a pixel included in a display panel according to embodiments.

Referring to FIG. 14, a display panel according to embodiments may include a red pixel RPX6 that emits red light, a green pixel GPX6 that emits green light, and a blue pixel BPX6 that emits blue light. Each of the red, green and blue pixels RPX6, GPX6 and BPX6 may include a storage capacitor Cst1 and Cst2, a first transistor TP11 and TP12, a second transistor TP2, a third transistor TN3, a fourth transistor TN4, a fifth transistor TP5, a sixth transistor TP6, a seventh transistor TN7' and an organic light emitting diode EL. In some embodiments, each of the red, green and blue pixels RPX6, GPX6 and BPX6 may further include a parasitic boost capacitor PCbst1 and PCbst2 and a negative parasitic boost capacitor Nbst1 and Nbst2. The red, green and blue pixels RPX6, GPX6 and BPX6 illustrated in FIG. 14 may have similar configurations and similar operations to red, green and blue pixels RPX5, GPX5 and BPX5 illustrated in FIG. 13, except that the seventh transistor TN7' operates in response to an emission signal EM.

The fifth and sixth transistors TP5 and TP6 may be turned on in response to the emission signal EM having a low level, and the seventh transistor TN7' may be turned on in response to the emission signal EM having a high level. For example, as illustrated in FIG. 15, in a period in which the emission signal EM has the high level, or in the frame period FP except for an emission period PEM, the seventh transistor TN7' may apply an anode initialization voltage AVINT to an anode of the organic light emitting diode EL in response to the emission signal EM having the high level.

Further, in the display panel according to embodiments, a size of at least one of the parasitic boost capacitor PCbst2, the negative parasitic boost capacitor Nbst2, the first transistor TP12 and the storage capacitor Cst2 included in the blue pixel BPX6 may be different from a size of a corresponding one of the parasitic boost capacitor PCbst1, the negative parasitic boost capacitor Nbst1, the first transistor TP11 and the storage capacitor Cst1 included in the red/green pixel RPX6/GPX6. Accordingly, a difference between luminance of the display panel driven at a normal driving frequency and luminance of the display panel driven at a low frequency may be reduced, and thus the luminance difference when a driving frequency for the display panel is changed may not be perceived by a user.

Figure 16:
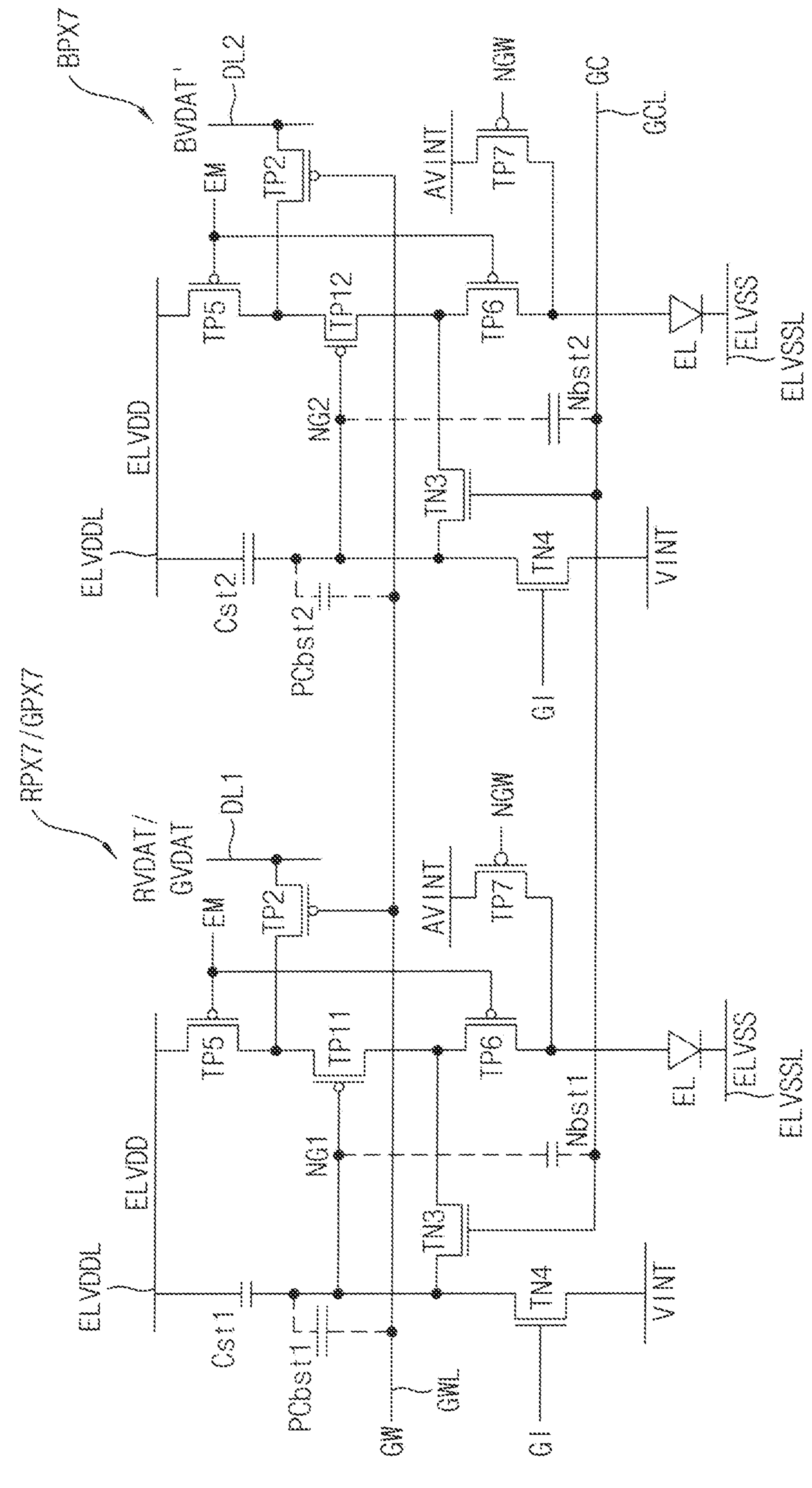
FIG. 16 is a circuit diagram illustrating an example of a red/green pixel and a blue pixel included in a display panel according to embodiments.
Figure 17:
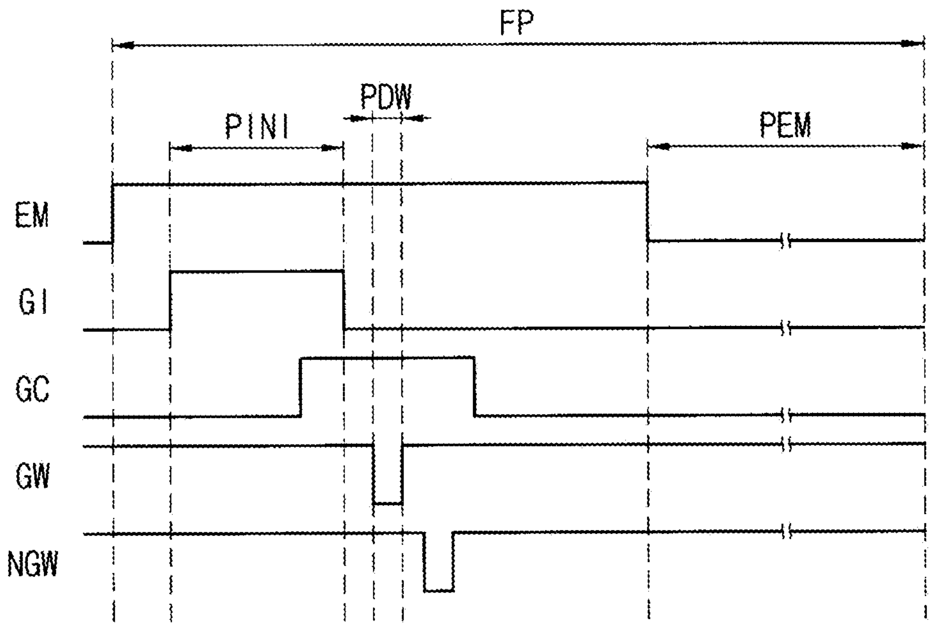
FIG. 17 is a timing diagram for describing an example of an operation of a pixel included in a display panel according to embodiments.

FIG. 16 is a circuit diagram illustrating an example of a red/green pixel and a blue pixel included in a display panel according to embodiments, and FIG. 17 is a timing diagram for describing an example of an operation of a pixel included in a display panel according to embodiments.

Referring to FIG. 16, a display panel according to embodiments may include a red pixel RPX7 that emits red light, a green pixel GPX7 that emits green light, and a blue pixel BPX7 that emits blue light. Each of the red, green and blue pixels RPX7, GPX7 and BPX7 may include a storage capacitor Cst1 and Cst2, a first transistor TP11 and TP12, a second transistor TP2, a third transistor TN3, a fourth transistor TN4, a fifth transistor TP5, a sixth transistor TP6, a seventh transistor TP7 and an organic light emitting diode EL. In some embodiments, each of the red, green and blue pixels RPX7, GPX7 and BPX7 may further include a parasitic boost capacitor PCbst1 and PCbst2 and a negative parasitic boost capacitor Nbst1 and Nbst2. The red, green and blue pixels RPX7, GPX7 and BPX7 illustrated in FIG. 16 may have similar configurations and similar operations to red, green and blue pixels RPX5, GPX5 and BPX5 illustrated in FIG. 13, except that the seventh transistor TP7 is implemented with a PMOS transistor.

The seventh transistor TP7 may apply an anode initialization voltage AVINT to an anode of the organic light emitting diode EL in response to a gate writing signal NGW for a next pixel row. For example, as illustrated in FIG. 17, the gate writing signal NGW for the next pixel row may have a low level after a data writing period PDW in which a gate writing signal GW for a current pixel row has the low level, and the seventh transistor TP7 may be turned on in response to the gate writing signal NGW for the next pixel row having the low level.

In some embodiments, as illustrated in FIG. 16, in each of the red, green and blue pixels RPX7, GPX7 and BPX7, the first, second, fifth, sixth and seventh transistors TP11, TP12, TP2, TP5, TP6 and TP7 may be implemented with PMOS transistors, and the third and fourth transistors TN3 and TN4 may be implemented with NMOS transistors. Although FIG. 16 illustrates an example where the seventh transistor TP7 is implemented with the PMOS transistor, according to embodiments, the seventh transistor TP7 may be implemented with the NMOS transistor. Since the third and fourth transistors TN3 and TN4 directly coupled to the storage capacitor Cst1 and Cst2 are implemented with the NMOS transistors, a leakage current through the third and fourth transistors TN3 and TN4 from the storage capacitor Cst1 and Cst2 may be reduced.

Further, in the display panel according to embodiments, a size of at least one of the parasitic boost capacitor PCbst2, the negative parasitic boost capacitor Nbst2, the first transistor TP12 and the storage capacitor Cst2 included in the blue pixel BPX7 may be different from a size of a corresponding one of the parasitic boost capacitor PCbst1, the negative parasitic boost capacitor Nbst1, the first transistor TP11 and the storage capacitor Cst1 included in the red/green pixel RPX7/GPX7. Accordingly, a difference between luminance of the display panel driven at a normal driving frequency and luminance of the display panel driven at a low frequency may be reduced, and thus the luminance difference when a driving frequency for the display panel is changed may not be perceived by a user.

Figure 18:
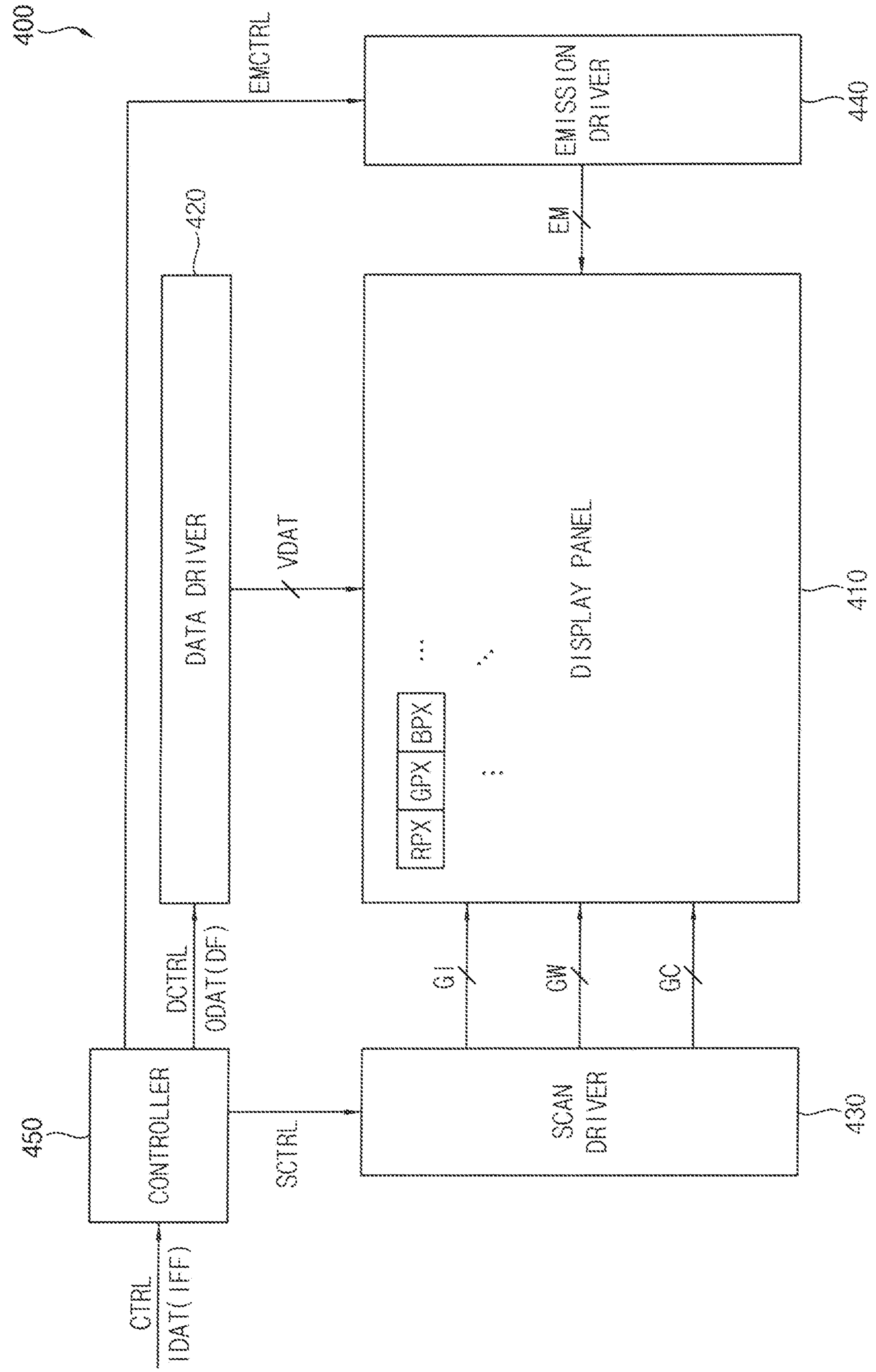
FIG. 18 is a block diagram illustrating an OLED display device according to embodiments.
Figure 19:
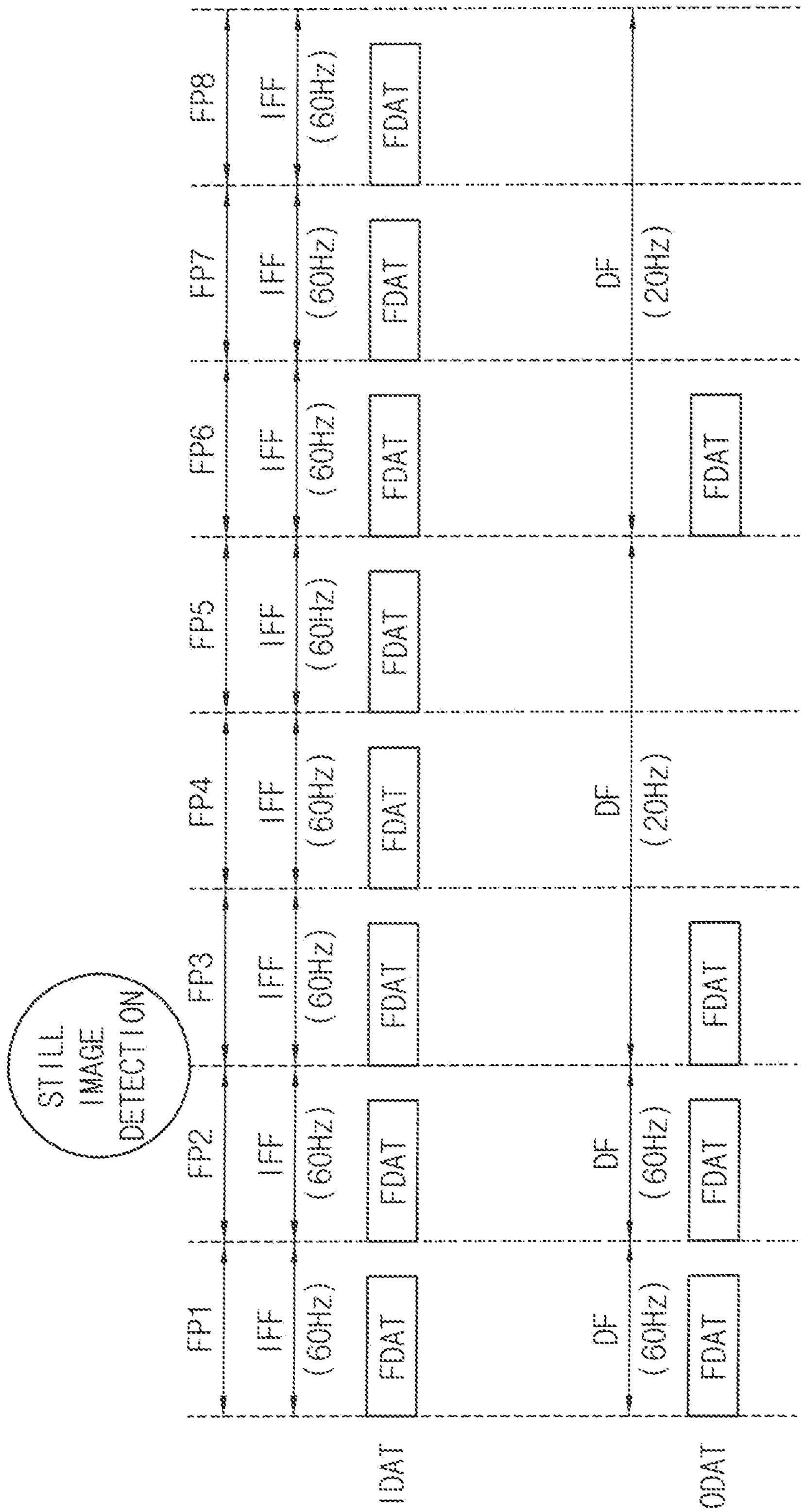
FIG. 19 is a timing diagram for describing an example of an operation of an OLED display device according to embodiments.

FIG. 18 is a block diagram illustrating an OLED display device according to embodiments, and FIG. 19 is a timing diagram for describing an example of an operation of an OLED display device according to embodiments.

Referring to FIG. 18, an OLED display device 400 may include a display panel 410 that includes a red pixel RPX, a green pixel GPX and a blue pixel BPX, a data driver 420 that provides data voltages VDAT to the red, green and blue pixels RPX, GPX and BPX, a scan driver 430 that provides a gate initialization signal GI, a gate writing signal GW and a gate compensation signal GC to the red, green and blue pixels RPX, GPX and BPX, an emission driver 440 that provides an emission signal EM to the red, green and blue pixels RPX, GPX and BPX, and a controller 450 that controls the data driver 420, the scan driver 430 and the emission driver 440.

According to embodiments, the display panel 410 may include red, green and blue pixels RPX1, GPX1 and BPX1 illustrated in FIG. 4, red, green and blue pixels RPX2, GPX2 and BPX2 illustrated in FIG. 9, red, green and blue pixels RPX3, GPX3 and BPX3 illustrated in FIG. 11, red, green and blue pixels RPX4, GPX4 and BPX4 illustrated in FIG. 12, red, green and blue pixels RPX5, GPX5 and BPX5 illustrated in FIG. 13, red, green and blue pixels RPX6, GPX6 and BPX6 illustrated in FIG. 14, red, green and blue pixels RPX7, GPX7 and BPX7 illustrated in FIG. 16, or the like. Each of the red, green and blue pixels RPX, GPX and BPX may include at least two transistors, at least one capacitor and an organic light emitting diode. In some embodiments, at least one of the at least two transistors, the at least one capacitor and the organic light emitting diode included in the blue pixel BPX may have a size different from a size of a corresponding one of the at least two transistors, the at least one capacitor and the organic light emitting diode included in the red/green pixel RPX/GPX. Accordingly, a difference between luminance of the display panel 410 driven at a normal driving frequency and luminance of the display panel 410 driven at a low frequency may be reduced, and thus the luminance difference when a driving frequency for the display panel 410 is changed may not be perceived by a user.

The data driver 420 may provide the data voltages VDAT to the red, green and blue pixels RPX, GPX and BPX in response to a data control signal DCTRL and output image data ODAT received from the controller 450. In some embodiments, the data control signal DCTRL may include, but not limited to, an output data enable signal, a horizontal start signal and a load signal. The data driver 420 may receive, as the output image data ODAT, frame data at a driving frequency DF from the controller 450. In some embodiments, the data driver 420 and the controller 450 may be implemented with a signal integrated circuit, and the signal integrated circuit may be referred to as a timing controller embedded data driver (TED). In other embodiments, the data driver 420 and the controller 450 may be implemented with separate integrated circuits.

The scan driver 430 may provide the gate initialization signal GI, the gate writing signal GW and the gate compensation signal GC to the red, green and blue pixels RPX, GPX and BPX in response to a scan control signal SCTRL received from the controller 450. In some embodiments, the scan control signal SCTRL may include, but not limited to, a scan start signal and a scan clock signal. In some embodiments, the scan driver 430 may sequentially provide each of the gate initialization signal GI, the gate writing signal GW and the gate compensation signal GC to the red, green and blue pixels RPX, GPX and BPX on a pixel row basis. In some embodiments, the scan driver 430 may be integrated or formed in a peripheral portion of the display panel 410. In other embodiments, the scan driver 430 may be implemented with at least one integrated circuit.

The emission driver 440 may provide the emission signal EM to the red, green and blue pixels RPX, GPX and BPX in response to an emission control signal EMCTRL received from the controller 450. In some embodiments, the emission control signal EMCTRL may include, but not limited to, an emission start signal and an emission clock signal. In some embodiments, the emission driver 440 may sequentially provide the emission signal EM to the red, green and blue pixels RPX, GPX and BPX on a pixel row basis. In some embodiments, the emission driver 440 may be integrated or formed in the peripheral portion of the display panel 410. In other embodiments, the emission driver 440 may be implemented with at least one integrated circuit.

The controller 450 (e.g., a timing controller (TCON)) may receive input image data IDAT and a control signal CTRL from an external host processor (e.g., an application processor (AP), a graphic processing unit (GPU) or a graphic card). In some embodiments, the control signal CTRL may include, but not limited to, a vertical synchronization signal, a horizontal synchronization signal, an input data enable signal, a master clock signal, etc. The controller 450 may generate the output image data ODAT, the data control signal DCTRL, the scan control signal SCTRL and the emission control signal EMCTRL based on the input image data IDAT and the control signal CTRL. The controller 450 may control an operation of the data driver 420 by providing the output image data ODAT and the data control signal DCTRL to the data driver 420, may control an operation of the scan driver 430 by providing the scan control signal SCTRL to the scan driver 430, and may control an operation of the emission driver 440 by providing the emission control signal EMCTRL to the emission driver 440.

In some embodiments, the controller 450 of the OLED display device 400 may change the driving frequency DF for the display panel 410 by analyzing the input image data IDAT. For example, the OLED display device 400 may drive the display panel 410 at a normal driving frequency or an input frame frequency IFF (e.g., about 60 Hz) of the input image data IDAT when the input image data IDAT represent a moving image and may drive the display panel 410 at a low frequency lower than the normal driving frequency or the input frame frequency IFF when the input image data IDAT represent a still image. In an embodiment, although the controller 450 receives the input image data IDAT at the fixed input frame frequency IFF (e.g., about 60 Hz), the controller 450 may provide the output image data ODAT at the driving frequency in a wide driving frequency range (e.g., from about 1 Hz to about 60 Hz) to the data driver 420. For example, as illustrated in FIG. 19, in first and second frame periods FP1 and FP2 in which the input image data IDAT represent the moving image, the controller 450 may receive, as the input image data IDAT, frame data FDAT at the input frame frequency IFF of about 60 Hz, and may provide, as the output image data ODAT, the frame data FDAT at a driving frequency DF of about 60 Hz substantially the same as the input frame frequency IFF. Accordingly, the display panel 410 may be driven at the driving frequency DF of about 60 Hz. If the still image is detected, the controller 450 may determine the driving frequency DF of the display panel 410 as the low frequency, for example about 20 Hz lower than the input frame frequency IFF of about 60 Hz. In a case where the input image data IDAT represent the still image, the controller 450 may provide the frame data FDAT to the data driver 420 in third and sixth frame periods FP3 and FP6 and may not provide the frame data FDAT to the data driver 420 in fourth, fifth, seventh and eighth frame periods FP4, FP5, FP7 and FP8. Accordingly, in the third through eighth frame periods FP3 through FP8, the controller 450 may provide the frame data FDAT at the driving frequency DF of about 20 Hz corresponding to one-third of the input frame frequency IFF of about 60 Hz to the data driver 420, and the data driver 420 may drive the display panel 410 at driving frequency DF of about 20 Hz. Although FIG. 19 illustrates an example where the display panel 410 is driven at the driving frequency DF of about 60 Hz or the driving frequency DF of about 20 Hz, according to embodiments, the display panel 410 may be driven at the driving frequency DF in the wide driving frequency range (e.g., from about 1 Hz to about 60 Hz).

Further, although FIG. 19 illustrates an example where the controller 450 receives the input image data IDAT at the fixed input frame frequency IFF of about 60 Hz, in other embodiments, the controller 450 may receive the input image data IDAT at a variable input frame frequency IFF (e.g., from about 1 Hz to about 60 Hz). In this case, the OLED display device 400 may drive the display panel 410 at a variable driving frequency DF corresponding to the variable input frame frequency IFF.

As described above, the driving frequency DF of the display panel 410 may be changed. However, in the OLED display device 400 according to embodiments, at least one of the at least two transistors, the at least one capacitor and a parasitic capacitor included in the blue pixel BPX may have a size different from a size of a corresponding one of the at least two transistors, the at least one capacitor and the parasitic capacitor included in the red pixel RPX or the green pixel GPX. Accordingly, a difference between luminance of the display panel 410 driven at the normal driving frequency and luminance of the display panel driven 410 at the low frequency may be reduced, and thus the luminance difference when the driving frequency DF for the display panel 410 is changed may not be perceived by a user.

Figure 20:
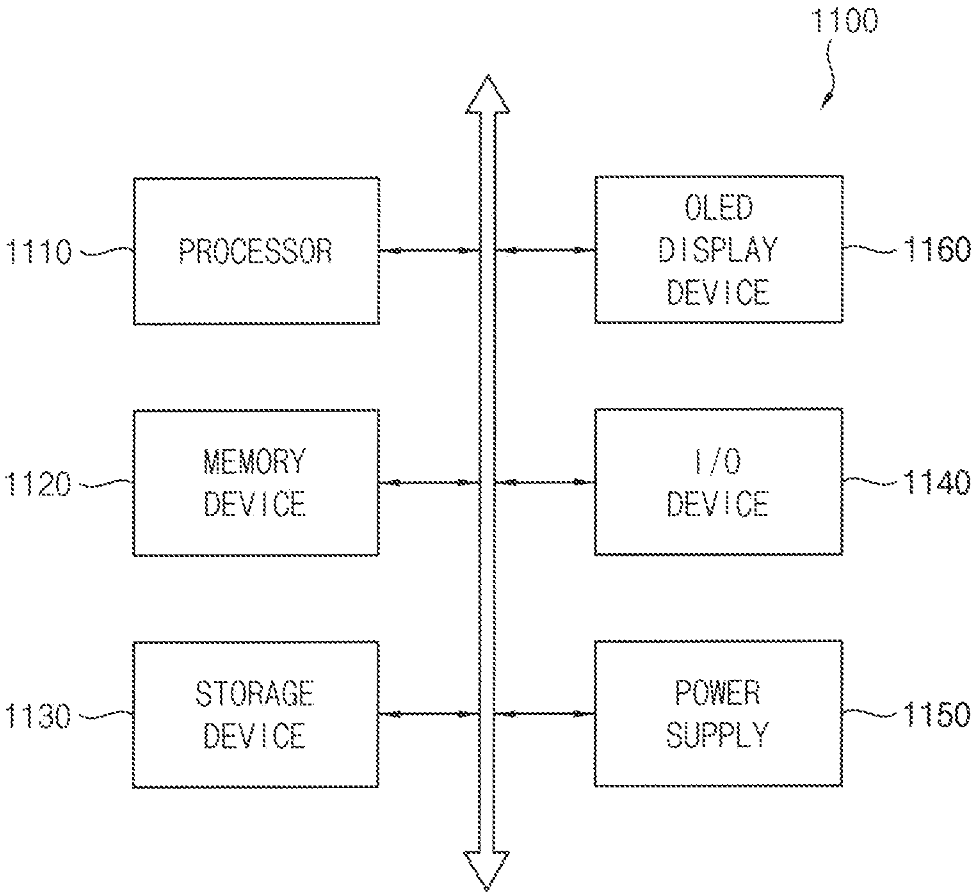
FIG. 20 is an electronic device including an OLED display device according to embodiments.

FIG. 20 is an electronic device including an OLED display device according to embodiments.

Referring to FIG. 20, an electronic device 1100 may include a processor 1110, a memory device 1120, a storage device 1130, an input/output (I/O) device 1140, a power supply 1150 and an OLED display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The OLED display device 1160 may be coupled to other components through the buses or other communication links.

In the OLED display device 1160, each of first, second and third pixels may include at least two transistors, at least one capacitor and an organic light emitting diode. At least one of the at least two transistors, the at least one capacitor and a parasitic capacitor included in the third pixel (e.g., a blue pixel) may have a size different from a size of a corresponding one of the at least two transistor and the at least one capacitor included in the first pixel (e.g., a red pixel) or the second pixel (e.g., a green pixel). Accordingly, when a driving frequency for a display panel is changed, a difference between luminance of the display panel driven at a previous driving frequency and luminance of the display panel driven at a current driving frequency may be reduced, and the luminance difference may not be perceived by a user.

The inventive concepts may be applied to any OLED display device 1160, and any electronic device 1100 including the OLED display device 1160. For example, the inventive concepts may be applied to a mobile phone, a smart phone, a wearable electronic device, a tablet computer, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display panel of a display device, the display panel comprising:

a first pixel configured to emit first color light;

a second pixel configured to emit second color light; and a third pixel configured to emit third color light, wherein each of the first, second and third pixels includes:

a storage capacitor including a first electrode coupled to a first power supply voltage line and a second electrode coupled to a gate node;

a boost capacitor including a first electrode coupled to the gate node, and a second electrode coupled to a gate writing signal line;

a first transistor including a gate electrode coupled to the gate node;

a second transistor configured to transfer a data voltage to a source of the first transistor in response to a gate writing signal of the gate writing signal line;

a third transistor configured to diode-connect the first transistor in response to a gate compensation signal of a gate compensation signal line; and a light emitting element including an anode, and a cathode coupled to a second power supply voltage line, and wherein a ratio of a channel width to a channel length of the first transistor in the third pixel is greater than a ratio of a channel width to a channel length of the first transistor in the first pixel or the second pixel, and wherein a size of the storage capacitor included in the third pixel is determined such that a data voltage range for the third pixel is adjusted close to a data voltage range for the first pixel or the second pixel.

2. The display panel of claim 1, wherein the channel width of the first transistor in the third pixel is greater than the channel width of the first transistor in the first pixel or the second pixel.

3. The display panel of claim 1, wherein the channel length of the first transistor in the third pixel is less than the channel length of the first transistor in the first pixel or the second pixel.

4. The display panel of claim 1, wherein the ratio of the channel width to the channel length of the first transistor included in the third pixel is determined such that a data voltage range for the third pixel is adjusted close to a data voltage range for the first pixel or the second pixel.

5. The display panel of claim 1, wherein the storage capacitor included in the third pixel has a size different from a size of the storage capacitor included in the first pixel or the second pixel.

6. The display panel of claim 1, wherein the size of the storage capacitor included in the third pixel is determined such that the data voltage range for the third pixel is adjusted to be disposed between a maximum data voltage of the first pixel and the second pixel, and a minimum data voltage of the first pixel and the second pixel.

7. The display panel of claim 1, wherein the boost capacitor included in the third pixel has a capacitance lower than a capacitance of the boost capacitor included in the first pixel or the second pixel.

8. The display panel of claim 1, wherein each of red, green and blue pixels further includes a negative parasitic boost capacitor between the gate compensation signal line and the gate electrode of the first transistor.

9. The display panel of claim 8, wherein a negative parasitic boost capacitor included in the third pixel has a capacitance higher than a capacitance of a negative parasitic boost capacitor included in the first pixel or the second pixel.

10. The display panel of claim 9, wherein a width of the gate compensation signal line in the third pixel is greater than a width of the gate compensation signal line in the first pixel or the second pixel.

11. The display panel of claim 9, wherein an area of the gate electrode of the first transistor in the third pixel is greater than an area of the gate electrode of the first transistor in the first pixel or the second pixel.

12. The display panel of claim 1, wherein the storage capacitor included in the third pixel has a capacitance higher than a capacitance of the storage capacitor included in the first pixel or the second pixel.

13. The display panel of claim 1, wherein each of the first, second, and third pixels further includes:
- a fourth transistor configured to apply an initialization voltage to the gate node in response to a gate initialization signal;
- a fifth transistor configured to couple the first power supply voltage line and the source of the first transistor in response to an emission signal;
- a sixth transistor configured to couple a drain of the first transistor and the anode of the light emitting element in response to the emission signal; and
- a seventh transistor configured to apply an anode initialization voltage to the anode of the light emitting element in response to the gate compensation signal.

14. The display panel of claim 13, wherein the first, second, fifth and sixth transistors are implemented with PMOS transistors, and the third and fourth transistors are implemented with NMOS transistors.

15. The display panel of claim 14, wherein the seventh transistor is implemented with a PMOS transistor.

16. The display panel of claim 14, wherein the seventh transistor is implemented with an NMOS transistor.

17. The display panel of claim 1, wherein the first pixel is a red pixel that emits red light, the second pixel is a green pixel that emits green light, and the third pixel is a blue pixel that emits blue light.

18. A display device comprising:
- a display panel including a first pixel configured to emit first color light, a second pixel configured to emit second color light, and a third pixel configured to emit third color light;
- a data driver configured to provide data voltages to the first, second and third pixels;
- a scan driver configured to provide a gate writing signal, a gate compensation signal and a gate initialization signal to the first, second and third pixels;
- an emission driver configured to provide an emission signal to the first, second and third pixels; and
- a controller configured to control the data driver, the scan driver and the emission driver, wherein each of the first, second and third pixels includes:
- a storage capacitor including a first electrode coupled to a first power supply voltage line and a second electrode coupled to a gate node;
- a boost capacitor including a first electrode coupled to the gate node, and a second electrode coupled to a gate writing signal line;
- a first transistor including a gate electrode coupled to the gate node;
- a second transistor configured to transfer a data voltage to a source of the first transistor in response to a gate writing signal of the gate writing signal line;
- a third transistor configured to diode-connect the first transistor in response to a gate compensation signal of a gate compensation signal line; and
- a light emitting element including an anode, and a cathode coupled to a second power supply voltage line, and wherein a ratio of a channel width to a channel length of the first transistor in the third pixel is greater than a ratio of a channel width to a channel length of the first transistor in the first pixel or the second pixel, wherein a size of the storage capacitor included in the third pixel is determined such that a data voltage range for the third pixel is adjusted to be disposed between a maximum data voltage of the first pixel and the second pixel, and a minimum data voltage of the first pixel and the second pixel.

* * * * *